US009807558B2

(12) United States Patent
Shekalim

(10) Patent No.: US 9,807,558 B2
(45) Date of Patent: *Oct. 31, 2017

(54) IDENTIFYING REMOTE UNITS IN A WIRELESS DISTRIBUTION SYSTEM (WDS) BASED ON ASSIGNED UNIQUE TEMPORAL DELAY PATTERNS

(71) Applicant: Corning Optical Communications Wireless Ltd, Airport (IL)

(72) Inventor: Parwiz Shekalim, Netanya (IL)

(73) Assignee: Corning Optical Communications Wireless Ltd. (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/472,881

(22) Filed: Mar. 29, 2017

(65) Prior Publication Data
US 2017/0280293 A1 Sep. 28, 2017

Related U.S. Application Data

(63) Continuation of application No. 15/281,907, filed on Sep. 30, 2016, now Pat. No. 9,648,580.
(Continued)

(51) Int. Cl.
H04W 4/02 (2009.01)
H04W 8/00 (2009.01)
(Continued)

(52) U.S. Cl.
CPC ...... H04W 4/023 (2013.01); H04B 10/25753 (2013.01); H04W 4/06 (2013.01); H04W 8/005 (2013.01); H04W 88/085 (2013.01)

(58) Field of Classification Search
CPC .......................... H04L 45/124; H04W 88/085
(Continued)

(56) References Cited

U.S. PATENT DOCUMENTS 5,544,173 A * 8/1996 Meltzer .......... G01R 31/318586
714/726
9,648,580 B1 5/2017 Shekalim
(Continued)

FOREIGN PATENT DOCUMENTS

WO 2014189431 A1 11/2014

OTHER PUBLICATIONS

International Search Report and Written Opinion PCT/IL2017/050341 dated Jun. 6, 2017.

*Primary Examiner* — John J Lee
(74) *Attorney, Agent, or Firm* — C. Keith Montgomery

(57) ABSTRACT

Embodiments of the disclosure relate to identifying remote units in a wireless distribution system (WDS) based on assigned unique temporal delay patterns. The WDS includes a plurality of remote units configured to communicate communications signals in signal paths. Each of the signal paths is assigned a unique temporal delay pattern. The communications signals are digitally delayed by respective delay elements based on the plurality of unique temporal delay patterns to provide delayed communications signals. A remote unit identification system analyzes a delayed communications signal to determine a respective temporal delay pattern associated within the delayed communication signal. By uniquely identifying a remote unit from which a delayed communication signal is communicated, it is possible to determine the locations client devices in the WDS, thus enabling a variety of location-based services and optimizations in the WDS.

19 Claims, 11 Drawing Sheets

Related U.S. Application Data

(60) Provisional application No. 62/312,130, filed on Mar. 23, 2016.

(51) Int. Cl.
    *H04W 4/06*     (2009.01)
    *H04B 10/2575*     (2013.01)
    *H04W 88/08*     (2009.01)

(58) Field of Classification Search
    USPC ..... 455/67.11, 456.1, 3.01, 3.03, 456.5, 500, 455/515
    See application file for complete search history.

(56) References Cited

U.S. PATENT DOCUMENTS

| | | | |
|---|---|---|---|
| 2001/0022782 A1* | 9/2001 | Steudle | H04W 24/10 370/335 |
| 2003/0220835 A1 | 11/2003 | Barnes, Jr. | |
| 2006/0136544 A1 | 6/2006 | Atsmon et al. | |
| 2008/0013482 A1 | 1/2008 | Kurokawa | |
| 2009/0046688 A1 | 2/2009 | Volpi et al. | |
| 2010/0097268 A1 | 4/2010 | Roh | |
| 2013/0317557 A1 | 11/2013 | Abdelgany | |
| 2014/0112667 A1 | 4/2014 | Neukirch et al. | |
| 2014/0233548 A1* | 8/2014 | Leizerovich | H04W 74/08 370/338 |
| 2015/0087329 A1 | 3/2015 | Stratford et al. | |
| 2015/0317557 A1* | 11/2015 | Julian | G06N 3/08 706/25 |
| 2016/0065320 A1 | 3/2016 | Berlin et al. | |

\* cited by examiner

| CLIENT DEVICE | ASSIGNED TA | PROPAGATION DELAY IN DELAYED UPLINK COMMUNICATIONS SIGNALS 212U'(1)-212U'(N) | | | ΔTA | | | RELATED REMOTE UNIT |
|---|---|---|---|---|---|---|---|---|
| | | TEMPORAL DELAY PERIOD 300(1) | TEMPORAL DELAY PERIOD 300(2) | TEMPORAL DELAY PERIOD 300(3) | TEMPORAL DELAY PERIOD 300(1) | TEMPORAL DELAY PERIOD 300(2) | TEMPORAL DELAY PERIOD 300(3) | |
| CLIENT DEVICE 226 ASSOCIATED WITH REMOTE UNIT 204(1) | TA = 23TU | 23TU | 25TU | 27TU | ΔTA = 0TU | ΔTA = 2TU | ΔTA = 4TU | REMOTE UNIT 201(1) |
| CLIENT DEVICE 226 ASSOCIATED WITH REMOTE UNIT 204(2) | TA = 13TU | 17TU | 13TU | 15TU | ΔTA = 4TU | ΔTA = 0TU | ΔTA = 2TU | REMOTE UNIT 204(2) |
| CLIENT DEVICE 226 ASSOCIATED WITH REMOTE UNIT 204(N) | TA = 24TU | 24TU | 26TU | 26TU | ΔTA = 0TU | ΔTA = 2TU | ΔTA = 2TU | REMOTE UNIT 204(N) |

FIG. 5B

IDENTIFYING REMOTE UNITS IN A WIRELESS DISTRIBUTION SYSTEM (WDS) BASED ON ASSIGNED UNIQUE TEMPORAL DELAY PATTERNS

PRIORITY APPLICATIONS

This application is a continuation of U.S. application Ser. No. 15/281,907, filed Sep. 30, 2016 which claims the benefit of priority under 35 U.S.C. §119 of U.S. Provisional Application No. 62/312,130, filed on Mar. 23, 2016, the content of which are relied upon and incorporated herein by reference in their entireties.

BACKGROUND

The disclosure relates generally to a wireless distribution system (WDS), and more particularly to identifying remote units in a WDS.

Wireless customers are increasingly demanding digital data services, such as streaming video and other multimedia contents, for example. Some wireless customers use their wireless devices in areas poorly serviced by conventional cellular networks, such as inside certain buildings or areas. One response to the intersection of these two concerns has been the use of WDSs, such as a distributed antenna system (DAS) as an example. A DAS can be particularly useful when deployed inside buildings or other indoor environments where client devices may not otherwise be able to effectively receive radio frequency (RF) signals from a base transceiver station (BTS), for example, of a conventional cellular network. The DAS is configured to provide multiple coverage areas inside the buildings to support higher capacity and improved RF coverage. Each coverage area includes one or more remote units configured to provide communications services to the client devices within antenna ranges of the remote units.

In this regard, FIG. 1 illustrates distribution of communications services to remote coverage areas 100(1)-100(N) of a WDS 102, such as a distributed antenna system (DAS) for example. These communications services can include cellular services, wireless services, such as radio frequency identification (RFID) tracking, Wireless Fidelity (Wi-Fi), local area network (LAN), wireless LAN (WLAN), worldwide interoperability for microwave access (WiMAX), wide-band code-division multiple access (WCDMA), long-term evolution (LTE), and combinations thereof, as examples. The remote coverage areas 100(1)-100(N) may be remotely located. In this regard, the remote coverage areas 100(1)-100(N) are created by and centered on remote units 104(1)-104(N) (e.g., remote antenna units) connected to a central unit 106 (e.g., a head-end controller, a head-end unit, or a head-end equipment). The central unit 106 may be communicatively coupled to a signal source 108, for example, a base transceiver station (BTS) or a baseband unit (BBU). In this regard, the central unit 106 receives downlink communications signals 110D from the signal source 108 to be distributed to the remote units 104(1)-104(N). The remote units 104(1)-104(N) are configured to receive the downlink communications signals 110D from the central unit 106 over a communications medium 112 to be distributed to the respective remote coverage areas 100(1)-100(N) of the remote units 104(1)-104(N). Each of the remote units 104(1)-104(N) may include an RF transmitter/receiver and a respective antenna 114(1)-114(N) operably connected to the RF transmitter/receiver to wirelessly distribute the communications services to client devices 116 within the respective remote coverage areas 100(1)-100(N). The remote units 104(1)-104(N) are also configured to receive uplink communications signals 110U from the client devices 116 in the respective remote coverage areas 100(1)-100(N) to be distributed to the signal source 108.

It may be important to determine the location of client devices 116 within the WDS 102. For example, many context-aware and location-aware wireless services, such as enhanced 911 (E911) services, rely on accurately detecting the locations of wireless communications devices. A satellite-based location detection system, such as global positioning system (GPS) in the United States, may be unreliable in indoor environments served by the WDS 102 due to the inherent inability of a satellite signal to penetrate obstacles like building walls. Although it may be possible to determine general locations of the client devices 116 based on a signal source (e.g., base station) in a conventional cellular network, it remains challenging for signal sources to pinpoint the locations of the client devices within a WDS, such as WDS 102 in FIG. 1, with a higher degree of accuracy. The location of the client device 116 may be determined within in the WDS 102 based on identify the location of the remote unit 104(1)-104(N) with which the client device 116 is communicating. However, since the uplink communications signals 110U from the remote units 104(1)-104(N) are combined in the central unit 106 before being distributed to the signal source 102, the particular remote unit 104 with which the client devices 116 are communicating cannot be determined.

No admission is made that any reference cited herein constitutes prior art. Applicant expressly reserves the right to challenge the accuracy and pertinency of any cited documents.

SUMMARY

Embodiments of the disclosure relate to identifying remote units in a wireless distribution system (WDS) based on assigned unique temporal delay patterns. For example, identifying remote units in a WDS can be used for determining client device location within the WDS. In this regard, the WDS includes a plurality of remote units configured to communicate communications signals, for example downlink communications signals and uplink communications signals, in signal paths communicatively coupled to the plurality of remote units. Each of the signal paths corresponding to a respective remote unit is assigned a unique temporal delay pattern. The communications signals communicated in the signal paths are digitally delayed by respective delay elements provided in the signal paths based on the plurality of unique temporal delay patterns assigned to the remote units to provide delayed communications signals. To identify a remote unit associated with a delayed communications signal, a remote unit identification system is provided. The remote unit identification system is configured to analyze a delayed communications signal to determine a respective unique temporal delay pattern (e.g., a sequence of timing advances (TAs)) associated within the delayed communications signal. This allows the remote unit identification system to identify the remote unit among the plurality of remote units that communicates the delayed communications signal by associating the analyzed temporal delay pattern in the delayed communications signal with the unique temporal delay patterns assigned to the remote units. By uniquely identifying a remote unit with which a delayed communication signal is communicated, it is possible to determine the locations of client devices in the WDS, thus enabling a variety of location-based services and optimizations in the WDS, as examples.

One embodiment of the disclosure relates to a remote unit identification system for uniquely identifying a plurality of remote units in a WDS. The remote unit identification system comprises a controller configured to assign a plurality of unique temporal delay patterns to the plurality of remote units in the WDS, respectively. Each remote unit among the plurality of remote units is configured to communicate a respective communications signal among a plurality of communications signals with a central unit in the WDS in a respective signal path among a plurality of signal paths disposed between the central unit and the plurality of remote units. The respective communications signal is digitally delayed by a respective delay element among a plurality of delay elements disposed in the respective signal path among the plurality of signal paths based on a respective unique temporal delay pattern assigned to the remote unit to provide a respective delayed communications signal. The remote unit identification system also comprises a determination unit. The determination unit is configured to analyze at least one delayed communications signal communicated in at least one signal path among the plurality of signal paths. The determination unit is also configured to determine a unique temporal delay pattern associated with the at least one delayed communications signal. The determination unit is also configured to identify a remote unit among the plurality of remote units communicating the at least one delayed communications signal in the at least one signal path based on the unique temporal delay pattern.

An additional embodiment of the disclosure relates to a method for uniquely identifying a plurality of remote units in a WDS. The method comprises assigning a plurality of unique temporal delay patterns to the plurality of remote units communicatively coupled to a plurality of signal paths, respectively. The method also comprises digitally delaying a plurality of communications signals communicated in the plurality of signal paths based on the plurality of unique temporal delay patterns to provide a plurality of delayed communications signals, respectively. The method also comprises analyzing the plurality of delayed communications signals communicated in the plurality of signal paths. The method also comprises determining a unique temporal delay pattern associated with each of the plurality of delayed communications signals communicated in a respective signal path among the plurality of signal paths. The method also comprises identifying a remote unit among the plurality of remote units communicatively coupled to the respective signal path based on the unique temporal delay pattern.

An additional embodiment of the disclosure relates to a WDS. The WDS comprises a plurality of signal paths. The WDS also comprises a plurality of remote units. Each remote unit among the plurality of remote units is communicatively coupled to a respective signal path among the plurality of signal paths. The WDS also comprises a central unit configured to communicate a respective communications signal among a plurality of communications signals to each remote unit among the plurality of remote units in the respective signal path communicatively coupled to the remote unit. The WDS also comprises a plurality of delay elements disposed in the plurality of signal paths, respectively. Each delay element among the plurality of delay elements is configured to digitally delay the respective communications signal communicated in the respective signal path according to a unique temporal delay pattern among a plurality of unique temporal delay patterns assigned to a respective remote unit among the plurality of remote units communicatively coupled to the respective signal path to provide a delayed communications signal in the respective signal path. The WDS also comprises a remote unit identification system. The remote unit identification system comprises a controller configured to assign the plurality of unique temporal delay patterns to the plurality of remote units in the WDS. The remote unit identification system also comprises a determination unit. For at least one delayed communications signal provided in at least one signal path among the plurality of signal paths, the determination unit is configured to determine a unique temporal delay pattern associated with the at least one delayed communications signal. For the at least one delayed communications signal provided in the at least one signal path among the plurality of signal paths, the determination unit is also configured to identify a remote unit among the plurality of remote units communicatively coupled to the at least one signal path based on the unique temporal delay pattern.

An additional embodiment of the disclosure relates to a method for identifying a client device in a WDS. The method comprises receiving an identification of the client device. The method also comprises logically organizing a plurality of remote units in the WDS into a first remote unit group and a second remote unit group. For each remote unit group among the first remote unit group and the second remote unit group, the method comprises assigning one or more unique temporal delay patterns to one or more remote units in the remote unit group, respectively. For each remote unit group among the first remote unit group and the second remote unit group, the method also comprises delaying one or more communications signals communicated with the one or more remote units in the remote unit group based on the one or more unique temporal delay patterns, respectively. For each remote unit group among the first remote unit group and the second remote unit group, the method also comprises analyzing a call report to determine whether a timing advance (TA) corresponding to the client device changes in response to delaying the one or more communications signals based on the one or more unique temporal delay patterns. For each remote unit group among the first remote unit group and the second remote unit group, if the TA of the client device has changed and if the remote unit group comprises only one remote unit, the method also comprises reporting an identification of the remote unit in the remote unit group. For each remote unit group among the first remote unit group and the second remote unit group, if the TA of the client device has changed and if the remote unit group comprises more than one remote unit, the method also comprises logically organizing the remote units in the remote unit group into the first remote unit group and the second remote unit group.

Additional features and advantages will be set forth in the detailed description which follows and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding of the disclosure, and are incorporated in and constitute a part of this specification. The drawings

BRIEF DESCRIPTION OF THE DRAWINGS

FIG. 5B is a table providing an exemplary illustration of determining the plurality of unique temporal delay patterns based on propagation delays of a plurality of delayed communications signals in the WDS of FIG. 2;

DETAILED DESCRIPTION

Embodiments of the disclosure relate to identifying remote units in a wireless distribution system (WDS) based on assigned unique temporal delay patterns. For example, identifying remote units in a WDS can be used for determining client device location within the WDS. In this regard, the WDS includes a plurality of remote units configured to communicate communications signals, for example downlink communications signals and uplink communications signals, in signal paths communicatively coupled to the plurality of remote units. Each of the signal paths corresponding to a respective remote unit is assigned a unique temporal delay pattern. The communications signals communicated in the signal paths are digitally delayed by respective delay elements provided in the signal paths based on the plurality of unique temporal delay patterns assigned to the remote units to provide delayed communications signals. To identify a remote unit associated with a delayed communications signal, a remote unit identification system is provided. The remote unit identification system is configured to analyze a delayed communications signal to determine a respective unique temporal delay pattern (e.g., a sequence of timing advances (TAs)) associated within the delayed communications signal. This allows the remote unit identification system to identify the remote unit among the plurality of remote units that communicates the delayed communications signal by associating the analyzed temporal delay pattern in the delayed communications signal with the unique temporal delay patterns assigned to the remote units. By uniquely identifying a remote unit with which a delayed communication signal is communicated, it is possible to determine the locations of client devices in the WDS, thus enabling a variety of location-based services and optimizations in the WDS, as examples.

Figure 1:
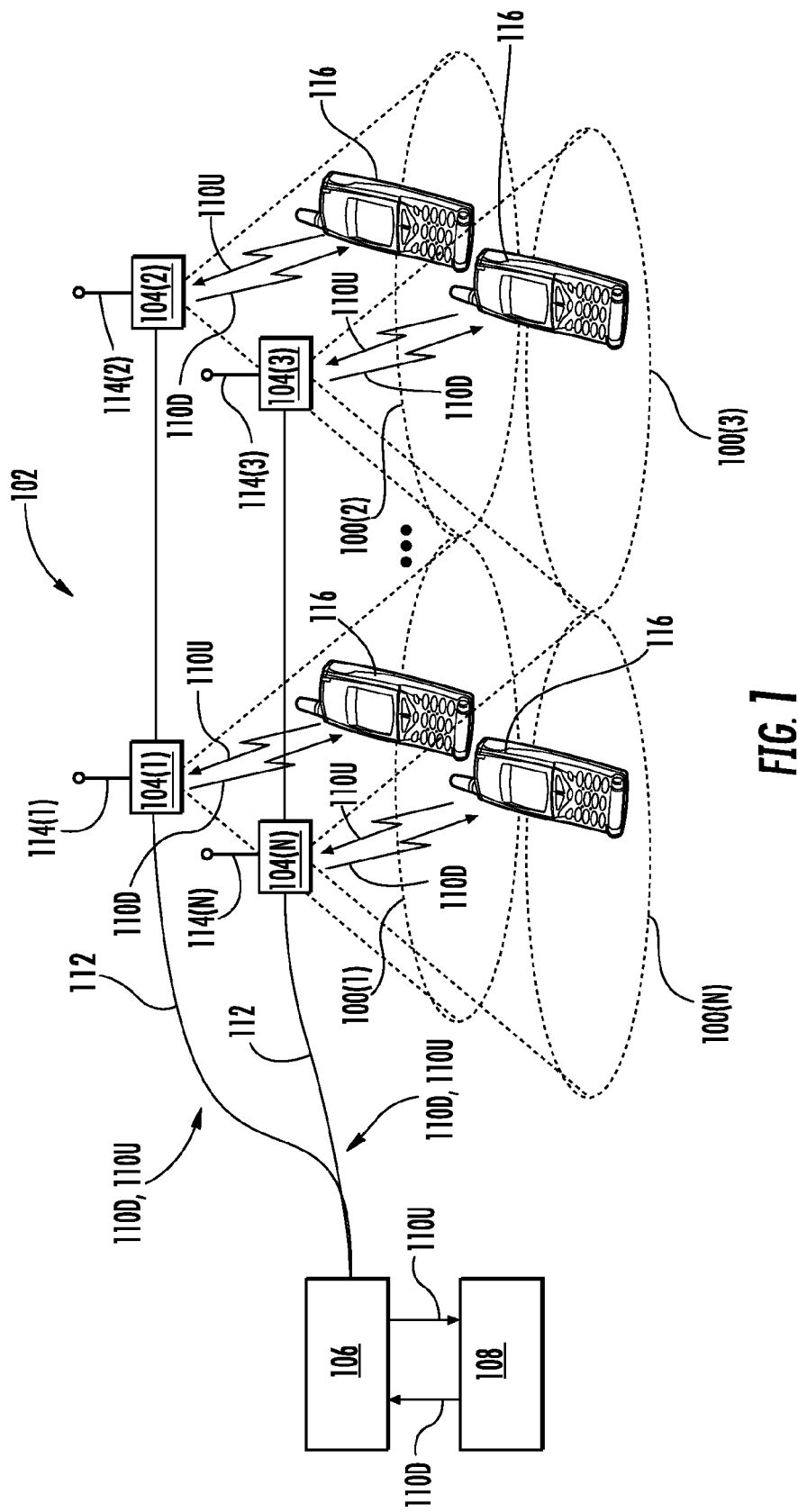
FIG. 1 is a schematic diagram of an exemplary wireless distribution system (WDS)
Figure 2:
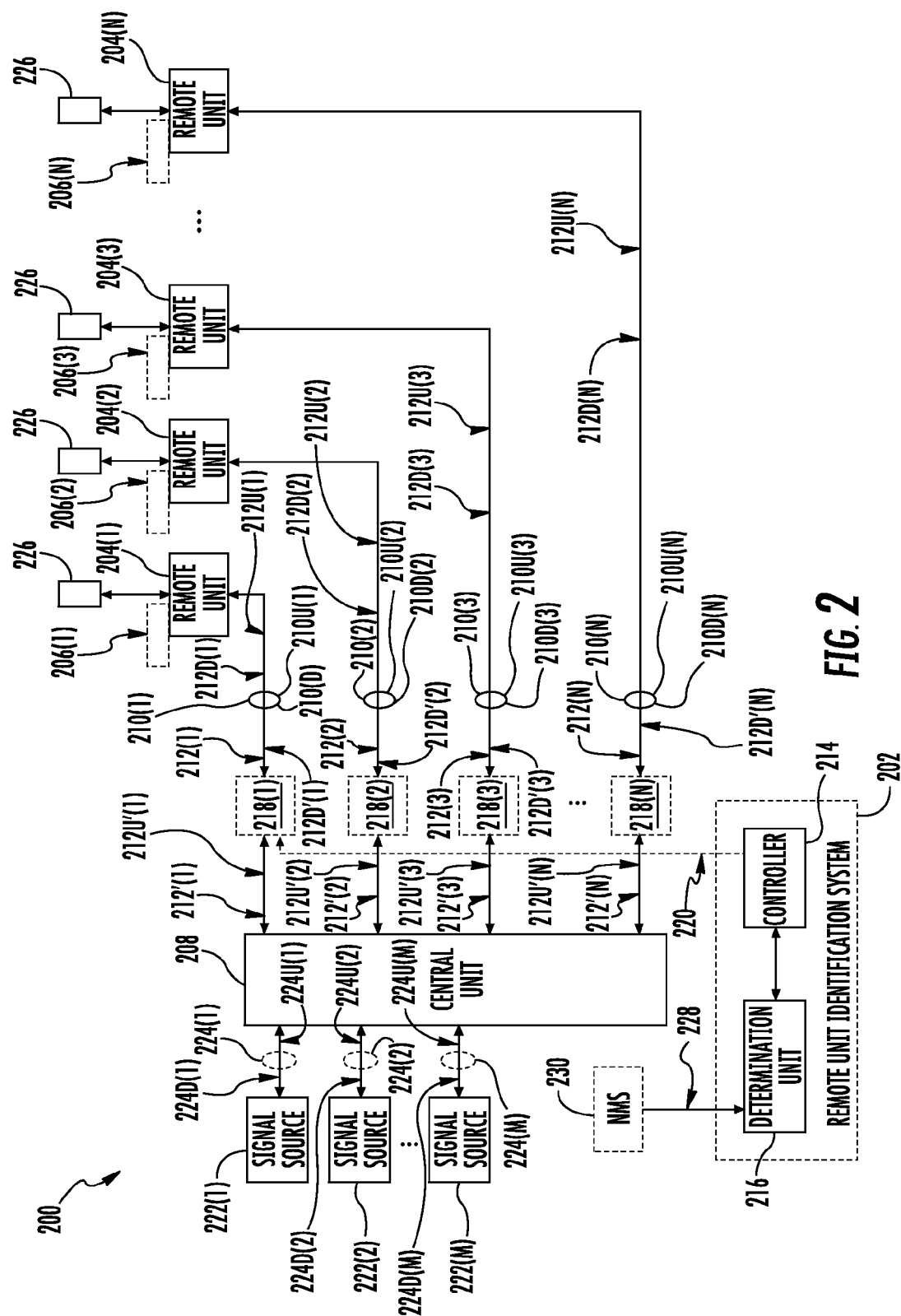
FIG. 2 is a schematic diagram of an exemplary WDS that includes a remote unit identification system configured to uniquely identify a plurality of remote units in the WDS by associating temporal delay patterns in delayed communications signals with unique temporal delay patterns associated with the remote units.

In this regard, FIG. 2 is a schematic diagram of an exemplary WDS 200 that includes a remote unit identification system 202 configured to uniquely identify a plurality of remote units 204(1)-204(N) by associating a plurality of unique temporal delay patterns 206(1)-206(N) with the plurality of remote units 204(1)-204(N), respectively. With reference to FIG. 2, the WDS 200 includes a central unit 208. The WDS 200 also includes a plurality of signal paths 210(1)-210(N) disposed between the central unit 208 and the plurality of remote units 204(1)-204(N). In this regard, the plurality of signal paths 210(1)-210(N) communicatively couples the plurality of remote units 204(1)-204(N) with the central unit 208. The central unit 208 communicates a plurality of communications signals 212(1)-212(N) with the plurality of remote units 204(1)-204(N) in the plurality of signal paths 210(1)-210(N), respectively.

The remote unit identification system 202 includes a controller 214 and a determination unit 216. In non-limiting examples, the determination unit 216 may be provided as an electronic circuitry, a general purpose processor, a dedicated signal processor, and/or an electronic device. The WDS 200 also includes a plurality of delay elements 218(1)-218(N) provided in the plurality of signal paths 210(1)-210(N), respectively. In this regard, each of the plurality of remote units 204(1)-204(N) is associated with a respective delay element among the plurality of delay elements 218(1)-218(N) in a respective signal path among the plurality of signal paths 210(1)-210(N). In a first non-limiting example, the plurality of delay elements 218(1)-218(N) may be provided in the plurality of remote units 204(1)-204(N). In a second non-limiting example, it is also possible to provide the plurality of delay elements 218(1)-218(N) in the central unit 208.

The controller 214 assigns the plurality of unique temporal delay patterns 206(1)-206(N) to the plurality of remote units 204(1)-204(N), respectively. In a non-limiting example, the controller 214 may store the plurality of unique temporal delay patterns 206(1)-206(N) in local memory or in memories in the plurality of delay elements 218(1)-218(N). The controller 214 may configure and/or control the plurality of delay elements 218(1)-218(N) to digitally delay the plurality of communications signals 212(1)-212(N) based on the plurality of unique temporal delay patterns 206(1)-206(N), respectively, to provide a plurality of delayed communications signals 212'(1)-212'(N). In a non-limiting example, the controller 214 may configure and/or control the plurality of delay elements 218(1)-218(N) via at least one control signal 220. The plurality of delayed communications signals 212'(1)-212'(N) is the same as the plurality of communications signals 212(1)-212(N), but is temporally delayed by the plurality of delay elements 218(1)-218(N) according to the plurality of unique temporal delay patterns 206(1)-206(N).

With continuing reference to FIG. 2, the determination unit 216 is configured to analyze at least one delayed communications signal among the plurality of delayed communications signals 212'(1)-212'(N) communicated in at least one signal path among the plurality of signal paths 210(1)-210(N) to determine a unique temporal delay pattern associated with the at least one delayed communications signal. The determination unit 216 can then uniquely identify a remote unit among the plurality of remote units 204(1)-204(N) communicating the at least one delayed communications signal in the at least one signal path based on the determined unique temporal delay pattern. In this regard, by analyzing the plurality of delayed communications signals 212'(1)-212'(N) communicated in the plurality of signal paths 210(1)-210(N) to determine the plurality of unique temporal delay patterns 206(1)-206(N), the determination unit 216 is able to uniquely identify the plurality of remote units 204(1)-204(N) based on the plurality of determined unique temporal delay patterns 206(1)-206(N), respectively. By uniquely identifying the plurality of remote units 204(1)-204(N) based on the plurality of unique temporal delay patterns 206(1)-206(N), it is possible to determine locations of the plurality of remote units 204(1)-204(N), thus enabling a variety of location-based services and optimizations in the WDS 200. In a non-limiting example, each of the plurality of remote units 204(1)-204(N) may correspond to a predefined physical location (e.g., conference room A of building C, second floor of building G, etc.). The predefined physical location may be predefined in association with identification (e.g., remote unit name) of the remote unit. In this regard, the determination unit 216 may determine the predefined physical location of each of the plurality of remote units 204(1)-204(N) based the identification of the remote unit.

Figure 3:
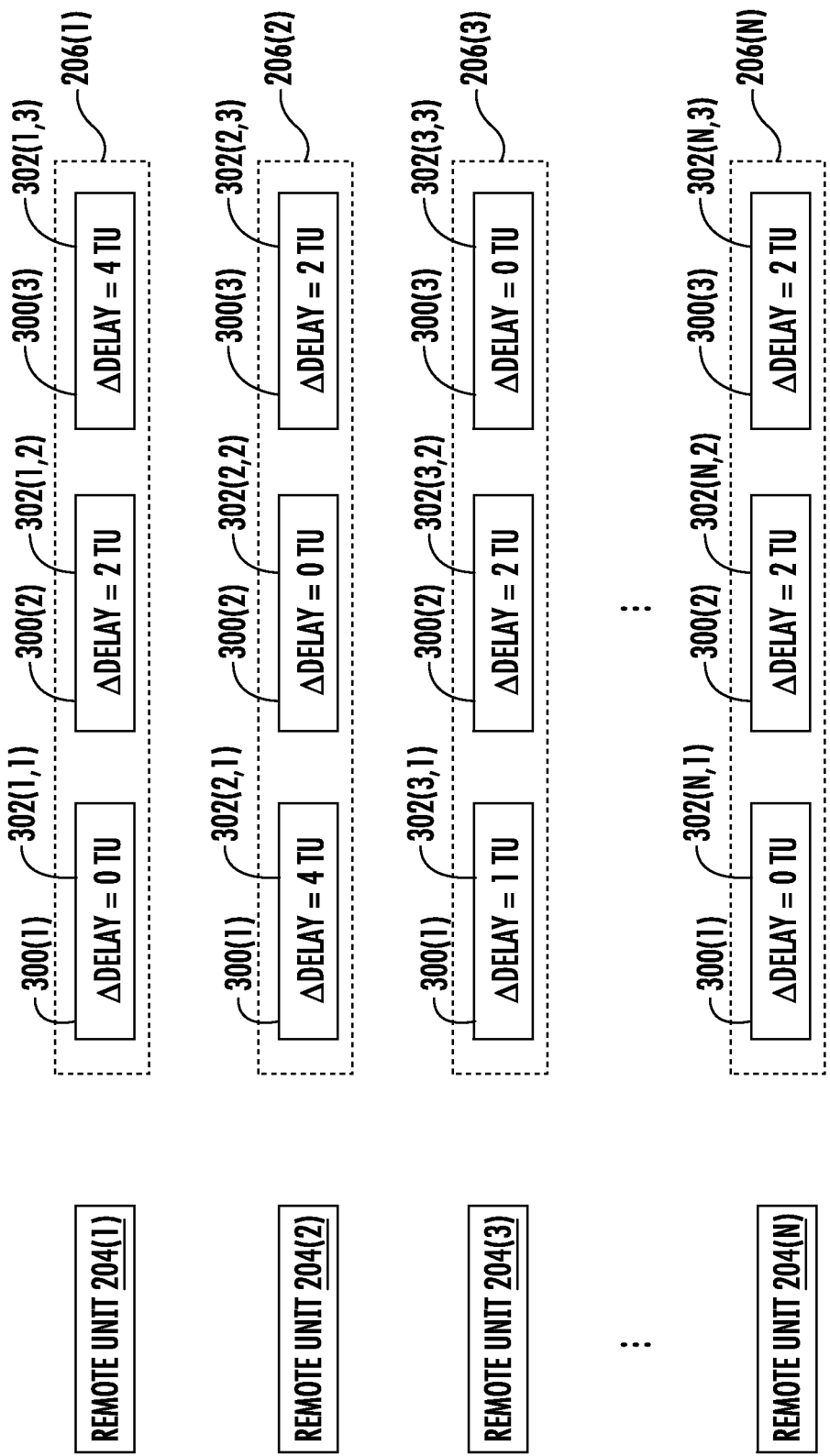
FIG. 3 is a schematic diagram providing an exemplary illustration of the plurality of unique temporal delay patterns in FIG. 2, which may be defined as a sequence of timing advances (TAs) as defined in the third generation partnership project (3GPP) long-term evolution (LTE) specification, to uniquely identify the plurality of remote units.

To explain one way that the determination unit 216 can uniquely identify the plurality of remote units 204(1)-204(N) based on the plurality of unique temporal delay patterns 206(1)-206(N), FIG. 3 is provided. FIG. 3 is a schematic diagram providing an exemplary illustration of the plurality of unique temporal delay patterns 206(1)-206(N) in FIG. 2 that can uniquely identify the plurality of remote units 204(1)-204(N). With reference to FIG. 3, the plurality of unique temporal delay patterns 206(1)-206(N) is assigned to the plurality of remote units 204(1)-204(N), respectively. Each of the plurality of unique temporal delay patterns 206(1)-206(N) includes a plurality of temporal delay periods 300(1)-300(3). Although each of the plurality of unique temporal delay patterns 206(1)-206(N) is shown hereinafter to include only three respective temporal delay periods 300(1)-300(3), it shall be appreciated that any integer number of temporal delay periods may be included in each of the plurality of unique temporal delay patterns 206(1)-206(N), as long as the integer number is greater than one and reasonable. Accordingly, the plurality of unique temporal delay patterns 206(1)-206(N) includes a plurality of temporal delay periods 302(1,1)-302(N,3), respectively. For example, the unique temporal delay pattern 206(1) includes the plurality of temporal delay periods 302(1,1)-302(1,3), the unique temporal delay pattern 206(2) includes the plurality of temporal delay periods 302(2,1)-302(2,3), and so on. In a non-limiting example, each of the plurality of temporal delay periods 302(1,1)-302(N,3) has a duration of one second (s).

With continuing reference to FIG. 3, each of the plurality of temporal delay periods 302(N,1)-302(N,3) corresponds to a respective temporal delay value ($\Delta$ Delay). The $\Delta$ Delay may be defined as integer multiple of a predefined temporal unit (TU). In a non-limiting example, the TU may equal to two hundred sixty point four (260.4) nanoseconds (ns) in communications systems, such as LTE for example. The three $\Delta$ Delays corresponding to the temporal delay periods 300(1)-300(3) in each of the plurality of unique temporal delay patterns 206(1)-206(N) define three temporal delays to be injected into each of the plurality of communications signals 212(1)-212(N) during the temporal delay periods 300(1)-300(3). Hence, in the non-limiting example, each of the plurality of unique temporal delay patterns 206(1)-206(N) is defined by a sequence of the three $\Delta$ Delays. In this regard, in another non-limiting example, the controller 214 may control each of the plurality of delay elements 218(1)-218(N) to digitally delay a respective communications signal according to the three $\Delta$ Delays in the temporal delay periods 300(1)-300(3), respectively, thus generating a respective unique temporal delay pattern in a respective delayed communications signal. For convenience of discussion and illustration, the unique temporal delay patterns 206(1), 206(2), and 206(N) are discussed hereinafter as non-limiting examples.

For example, the three $\Delta$ Delays corresponding to the temporal delay periods 300(1)-300(3) of the unique temporal delay pattern 206(1) are zero (0) TU, two (2) TU, and four (4) TU, respectively in this example. In this regard, the delay element 218(1) is configured to digitally delay the communications signal 212(1) communicated on the signal path 210(1) by 0 TU, 2 TU, and 4 TU during the temporal delay periods 300(1)-300(3), respectively. In a non-limiting example, the delay element 218(1) may digitally delay the communications signal 212(1) by buffering the communications signal 212(1) for 0 TU, 2 TU, and 4 TU during the temporal delay periods 300(1)-300(3), respectively. As such, the unique temporal delay pattern 206(1), as defined by a combination of the three $\Delta$ Delays during the temporal delay periods 300(1)-300(3), is a 0TU-2TU-4TU temporal delay pattern that will be associated with the delayed communications signal 212'(1) as well. In this regard, if the determination unit 216 determines that a delayed communications signal among the plurality of delayed communications signals 212'(1)-212'(N) is associated with the 0TU-2TU-4TU temporal delay pattern, the determination unit 216 may be able to identify the remote unit 204(1) as the remote unit communicating the delayed communications signal. In this regard, the determination unit 216 may determine a remote unit among the plurality of remote units 204(1)-204(N) by correlating a sequence of $\Delta$ Delays in time in a delayed communications signal among the plurality of delayed communications signals 212'(1)-212'(N) with a respective unique temporal delay pattern associated with the remote unit that communicates the delayed communications signal.

However, for the determination unit 216 to definitively identify the remote unit 204(1) based on the 0TU-2TU-4TU temporal delay pattern, the 0TU-2TU-4TU temporal delay pattern is configured to be uniquely distinguishable from rest of the plurality of unique temporal delay patterns 206(1)-206(N). As illustrated in FIG. 3, for example, the unique temporal delay pattern 206(2), as defined by a combination of the three A Delays during the temporal delay periods 300(1)-300(3), is a 4TU-0TU-2TU temporal delay pattern that is uniquely distinguishable from the 0TU-2TU-4TU temporal delay pattern of the unique temporal delay pattern 206(1). In a non-limiting example, the three A Delays during the temporal delay periods 300(1)-300(3) are applied to the remote units 204(1)-204(N) substantially concurrently. Accordingly, respective temporal delay periods corresponding to the 4TU-0TU-2TU and the 0TU-2TU-4TU start and finish at substantially similar times among the remote units 204(1)-204(N). Likewise, the unique temporal delay pattern 206(N), as defined by a combination of the three A Delays during the temporal delay periods 300(1)-300(3), is a 0TU-2TU-2TU temporal delay pattern, that is uniquely distinguishable from the 0TU-2TU-4TU temporal delay pattern of the unique temporal delay pattern 206(1) and the 4TU-0TU-2TU temporal delay pattern of the unique temporal delay pattern 206(2). As such, each of the plurality of unique temporal delay patterns 206(1)-206(N) can be defined to be uniquely distinguishable from rest of the plurality of unique temporal delay patterns 206(1)-206(N). As a result, the plurality of remote units 204(1)-204(N) can be uniquely identified based on the plurality of unique temporal delay patterns 206(1)-206(N) exhibited in the plurality of delayed communications signals 212'(1)-212'(N).

With reference back to FIG. 2, the plurality of signal paths 210(1)-210(N) further includes a plurality of downlink signal paths 210D(1)-210D(N) and a plurality of uplink signal paths 210U(1)-210U(N), respectively. In this regard, the plurality of remote units 204(1)-204(N) is communicatively coupled to the central unit 208 via the plurality of downlink signal paths 210D(1)-210D(N) and the plurality of uplink signal paths 210U(1)-210U(N). Accordingly, the central unit 208 can communicate a plurality of downlink communications signals 212D(1)-212D(N) to the plurality of remote units 204(1)-204(N) in the plurality of downlink signal paths 210D(1)-210D(N) and receive a plurality of uplink communications signals 212U(1)-212U(N) from the plurality of remote units 204(1)-204(N) in the plurality of uplink signal paths 210U(1)-210U(N), respectively. The controller 214 may configure and/or control the plurality of delay elements 218(1)-218(N) to digitally delay the plurality of uplink communications signals 212U(1)-212U(N) based on the plurality of unique temporal delay patterns 206(1)-206(N), respectively, to provide a plurality of delayed uplink communications signals 212U'(1)-212U'(N).

In one non-limiting example, the controller 214 may configure and/or control the plurality of delay elements 218(1)-218(N) to digitally delay the plurality of downlink communications signals 212D(1)-212D(N) based on the plurality of unique temporal delay patterns 206(1)-206(N), respectively, to provide a plurality of delayed downlink communications signals 212D'(1)-212D'(N). In another non-limiting example, the controller 214 may configure and/or control the plurality of delay elements 218(1)-218(N) to digitally delay the plurality of downlink communications signals 212D(1)-212D(N) and the plurality of uplink communications signals 212U(1)-212U(N) based on the plurality of unique temporal delay patterns 206(1)-206(N), respectively, to provide the plurality of delayed downlink communications signals 212D'(1)-212D'(N) and the plurality of delayed uplink communications signals 212U'(1)-212U'(N). In this regard, according to the discussions earlier, the plurality of delayed uplink communications signals 212U'(1)-212U'(N) and the plurality of delayed downlink communications signals 212D'(1)-212D'(N) are both associated with the plurality of unique temporal delay patterns 206(1)-206(N). The determination unit 216 can analyze at least one of the plurality of delayed uplink communications signals 212U'(1)-212U'(N) and/or at least one of the plurality of delayed downlink communications signals 212D'(1)-212D'(N). Accordingly, the determination unit 216 can uniquely identify the plurality of remote units 204(1)-204(N) based on the plurality of unique temporal delay patterns 206(1)-206(N) in the plurality of delayed uplink communications signals 212U'(1)-212U'(N) and/or the plurality of delayed downlink communications signals 212D'(1)-212D'(N).

Figure 4:
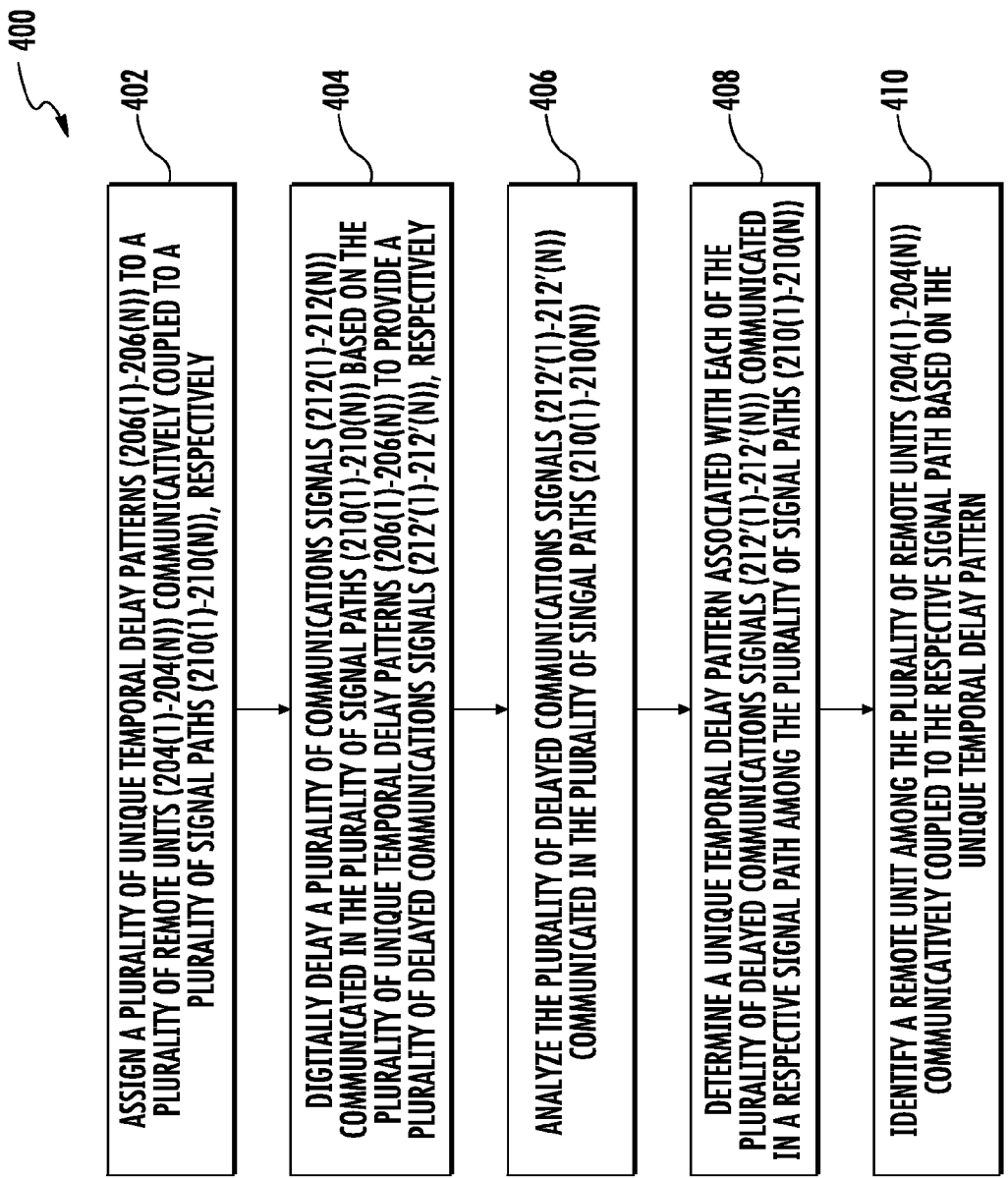
FIG. 4 is a flowchart of an exemplary remote unit identification process that may be employed to uniquely identify the plurality of remote units in the WDS of FIG. 2 by associating temporal delay patterns in delayed communication signals with unique temporal delay patterns associated with the remote units.

FIG. 4 is a flowchart of an exemplary remote unit identification process 400 that may be employed to uniquely identify the plurality of remote units 204(1)-204(N) in the WDS 200 of FIG. 2. With reference to FIG. 4, the controller 214 assigns the plurality of unique temporal delay patterns 206(1)-206(N) to the plurality of remote units 204(1)-204(N) that is communicatively coupled to the plurality of signal paths 210(1)-210(N), respectively (block 402). The plurality of delay elements 218(1)-218(N) digitally delays the plurality of communications signals 212(1)-212(N) communicated in the plurality of signal paths 210(1)-210(N) based on the plurality of unique temporal delay patterns 206(1)-206(N) to provide the plurality of delayed communications signals 212'(1)-212'(N), respectively (block 404). Specifically, the plurality of delay elements 218(1)-218(N) may digitally delay the plurality of downlink communications signals 212D(1)-212D(N) communicated in the plurality of downlink signal paths 210D(1)-210D(N) based on the plurality of unique temporal delay patterns 206(1)-206(N) to provide the plurality of delayed downlink communications signals 212D'(1)-212D'(N), respectively. The plurality of delay elements 218(1)-218(N) may also digitally delay the plurality of uplink communications signals 212U(1)-212U(N) communicated in the plurality of uplink signal paths 210U(1)-210U(N) based on the plurality of unique temporal delay patterns 206(1)-206(N) to provide the plurality of delayed uplink communications signals 212U'(1)-212U'(N), respectively. The plurality of delay elements 218(1)-218(N) may also digitally delay the plurality of downlink communications signals 212D(1)-212D(N) communicated in the plurality of downlink signal paths 210D(1)-210D(N) and the plurality of uplink communications signals 212U(1)-212U(N) communicated in the plurality of uplink signal paths 210U(1)-210U(N) based on the plurality of unique temporal delay patterns 206(1)-206(N) to provide the plurality of delayed downlink communications signals 212D'(1)-212D'(N) and the plurality of delayed uplink communications signals 212U'(1)-212U'(N), respectively. The determination unit 216 also analyzes the plurality of delayed communications signals 212'(1)-212'(N) communicated in the plurality of signal paths 210(1)-210(N) (block 406). Specifically, the determination unit 216 may analyze the plurality of delayed downlink communications signals 212D'(1)-212D'(N) communicated in the plurality of downlink signal paths 210D(1)-210D(N) and/or the plurality of delayed uplink communications signals 212U'(1)-212U'(N) communicated in the plurality of uplink signal paths 210U(1)-210U(N). Subsequently, the determination unit 216 determines a unique temporal delay pattern associated with each of the plurality of delayed communications signals 212'(1)-212'(N) communicated in a respective signal path among the plurality of signal paths 210(1)-210(N) (block 408). Specifically, the determination unit 216 may determine the unique temporal delay pattern associated with each of the plurality of delayed downlink communications signals 212D'(1)-212D'(N) communicated in a respective downlink signal path among the plurality of downlink signal paths 210D(1)-210D(N) and/or the unique temporal delay pattern associated with each of the plurality of delayed uplink communications signals 212U'(1)-212U'(N) communicated in a respective uplink signal path among the plurality of uplink signal paths 210U(1)-210U(N). The determination unit 216 can then identify a remote unit among the plurality of remote units 204(1)-204(N) communicatively coupled to the respective signal path based on the unique temporal delay pattern (block 410). The determination unit 216 may also identify the remote unit among the plurality of remote units 204(1)-204(N) communicatively coupled to the respective downlink signal path and/or the respective uplink signal path based on the unique temporal delay pattern.

With reference back to FIG. 2, the central unit 208 is communicatively coupled to one or more signal sources 222(1)-222(M) (e.g., BTS, evolution node B (eNB), etc.). The central unit 208 is configured to communicate one or more RF communications signals 224(1)-224(M) with the one or more signal sources 222(1)-222(M), respectively. More specifically, the central unit 208 is configured to receive one or more downlink RF communications signals 224D(1)-224D(M) from the one or more signal sources 222(1)-222(M) and communicate the one or more downlink RF communications signals 224D(1)-224D(M) to the plurality of remote units 204(1)-204(N) as the plurality of downlink communications signals 212D(1)-212D(N). The central unit 208 is also configured to communicate the plurality of uplink communications signals 212U(1)-212U(N) received from the plurality of remote units 204(1)-204(N) as one or more uplink RF communications signals 224U(1)-224U(M) to the one or more signal sources 222(1)-222(M).

With continuing reference to FIG. 2, each of the plurality of remote units 204(1)-204(N) communicates a respective communications signal among the plurality of communications signals 212(1)-212(N) to a respective client device 226. More specifically, each of the plurality of remote units 204(1)-204(N) transmits a respective downlink communications signal among the plurality of downlink communications signals 212D(1)-212D(N) to the respective client device 226 and receives a respective uplink communications signal among the plurality of uplink communications signals 212U(1)-212U(N) from the respective client device 226. Although only one respective client device 226 is shown in FIG. 2 for each of the plurality of remote units 204(1)-204(N), it shall be appreciated that each of the plurality of remote units 204(1)-204(N) can communicate concurrently with more than one respective client device 226.

In a non-limiting example, in wireless communications systems such as LTE, each of the client devices 226, for example the client device 226 associated with the remote unit 204(1), is assigned a respective TA by a respective signal source among the one or more signal sources 222(1)-222(M). The respective TA assigned to the client device 226 is a medium access control (MAC) control element (CE) that the respective signal source uses to control transmission timing of a respective communications signal among the plurality of communications signals 212(1)-212(N) communicated with the client device 226 to achieve timing synchronization with a subframe timing determined by the respective signal source. In a non-limiting example, the respective signal source keeps measuring the timing difference between the subframe timing and uplink control signals, such as sounding reference signals (SRSs), received from the client devices 226 on uplink control channels (e.g., physical uplink shared channel (PUSCH) or physical uplink control channel (PUCCH)). Based on the measured timing difference, the respective signal source can determine a round-trip propagation delay between the respective signal source and the client device 226. Based on the determined round-trip propagation delay, the respective signal source can assign the respective TA to the client device 226 to accommodate for respective propagation delay between the client device 226 and the respective signal source. In this regard, the respective TA assigned to the client device 226 accounts for one-half of the determined round-trip propagation delay. The respective TA assigned to each of the client devices 226 is defined as an integer multiple of the TU, which may equal 260.4 ns in LTE, as previously described.

With continuing reference to FIG. 2, as discussed above, the respective TA assigned to each of the client devices 226 reflects the respective propagation delay between each of the client devices 226 and the respective signal source among the one or more signal sources 222(1)-222(M). The respective propagation delay associated with each of the plurality of communications signals 212(1)-212(N) communicated with the client devices 226 may be obtained from a call report 228, which may contain information as shown in Table 1 below as a non-limiting example. In a non-limiting example, the determination unit 216 may retrieve the call report 228 from a network management system (NMS) 230.

TABLE 1

| Time (s) | Client Device Identification | Related Parameters |
| --- | --- | --- |
| 00.06.05 | Client device 226 associated with the remote unit 204(1) | TA = 23TU, . . . |
| 00.06.05 | Client device 226 associated with the remote unit 204(2) | TA = 17TU, . . . |
| : | : | : |
| 00.06.05 | Client device 226 associated with the remote unit 204(N) | TA = 24TU, . . . |
| 00.06.06 | Client device 226 associated with the remote unit 204(1) | TA = 25TU, . . . |
| 00.06.06 | Client device 226 associated with the remote unit 204(2) | TA = 13TU, . . . |
| : | : | : |
| 00.06.06 | Client device 226 associated with the remote unit 204(N) | TA = 26TU, . . . |
| 00.06.07 | Client device 226 associated with the remote unit 204(1) | TA = 27TU, . . . |
| 00.06.07 | Client device 226 associated with the remote unit 204(2) | TA = 15TU, . . . |
| : | : | : |
| 00.06.07 | Client device 226 associated with the remote unit 204(N) | TA = 26TU, . . . |

As shown in Table 1, at time 00.06.05 corresponding to the temporal delay period 300(1) of FIG. 3, the propagation delay of the communications signals 212(1), 212(2), and 212(N) are 23TU, 17TU, and 24TU, respectively. The 23TU, 17TU, and 24TU propagation delays may be observed in the downlink communications signals 212D(1), 212D(2), and 212D(N) and/or the uplink communications signals 212U(1), 212U(2), and 212U(N), respectively. Likewise, at time 00.06.06 corresponding to the temporal delay period 300(2) of FIG. 3, the propagation delay of the communications signals 212(1), 212(2), and 212(N) are 25TU, 13TU, and 26TU, respectively. The 25TU, 13TU, and 26TU propagation delays may also be observed in the downlink communications signals 212D(1), 212D(2), and 212D(N) and/or the uplink communications signals 212U(1), 212U(2), and 212U(N), respectively. At time 00.06.07 corresponding to the temporal delay period 300(3) of FIG. 3, the propagation delay of the communications signals

212(1), 212(2), and 212(N) are 27TU, 15TU, and 26TU, respectively. The 27TU, 15TU, and 26TU propagation delays may also be observed in the downlink communications signals 212D(1), 212D(2), and 212D(N) and/or the uplink communications signals 212U(1), 212U(2), and 212U(N), respectively. In this regard, the propagation delay of the communications signal 212(1) communicated with the client device 226 via the remote unit 204(1) has a respective propagation delay pattern of 23TU-25TU-27TU during the temporal delay periods 300(1)-301(3). The variations in the propagation delay may be the result of temporal delays injected into the downlink communications signal 212D(1) and/or the uplink communications signal 212U(1) by the delay element 218(1). Similarly, the propagation delay of the communications signal 212(2) communicated with the client device 226 via the remote unit 204(2) has a respective propagation delay pattern of 17TU-13TU-15TU during the temporal delay periods 300(1)-301(3). The propagation delay of the communications signal 212(N) communicated with the client device 226 via the remote unit 204(N) has a respective propagation delay pattern of 24TU-26TU-26TU during the temporal delay periods 300(1)-301(3). Likewise, the variations in the propagation delay may be the result of temporal delays injected into the downlink communications signals 212D(2) and 212D(N) and/or the uplink communications signals 212U(2) and 212U(N) by the delay elements 218(2) and 218(N), respectively.

Figure 5A:
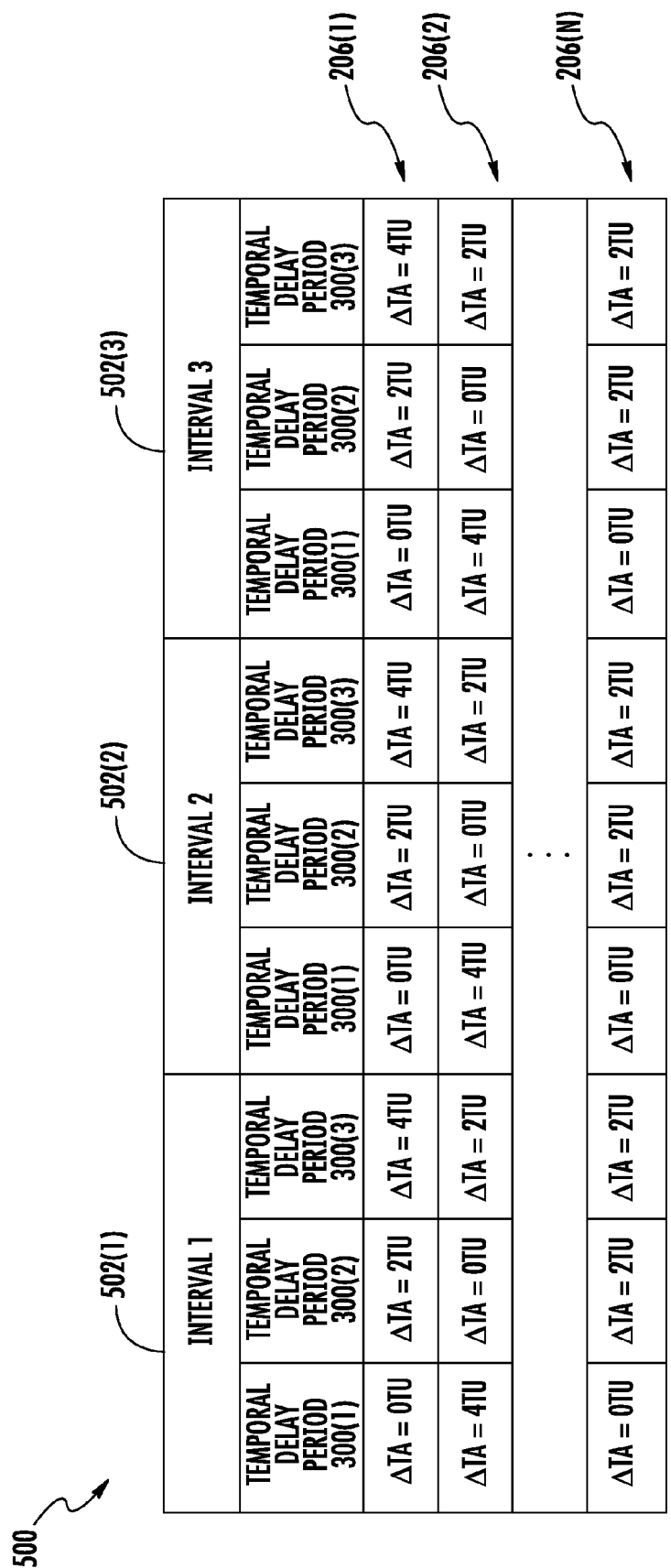
FIG. 5A is a table providing an exemplary illustration of the plurality of unique temporal delay patterns of FIG. 2, each defined based on respective timing advance (TA) changes.

According to previous discussions in FIG. 3, each of the plurality of unique temporal delay patterns 206(1)-206(N) is defined by a combination of three A Delays corresponding to respective temporal delay periods 300(1)-300(3). As such, if the respective TAs assigned to the client devices 226 are known, it may be possible to determine the plurality of unique temporal delay patterns 206(1)-206(N) based on the propagation delay patterns associated with the plurality of delayed communications signals 212'(1)-212'(N). In this regard, FIG. 5A is a table 500 providing an exemplary illustration of the plurality of unique temporal delay patterns 206(1)-206(N) of FIG. 2, each defined based on respective TA changes in the three temporal delay periods 300(1)-300(3) of FIG. 3. Common elements between FIGS. 2, 3, and 5A are shown therein with common element numbers and will not be re-described herein.

With reference to FIG. 5A, the plurality of unique temporal delay patterns 206(1)-206(N) is defined in one or more intervals 502(1)-502(3). Although only three intervals 502(1)-502(3) are shown in FIG. 5A, it shall be appreciated that any integer number of intervals may be defined for the plurality of unique temporal delay patterns 206(1)-206(N). Each of the one or more intervals 502(1)-502(3) includes the three temporal delay periods 300(1)-300(3). Each of the three temporal delay periods 300(1)-300(3) corresponds to a respective TA change (ATA) that is expressed as integer multiple of TU. In a non-limiting example, the TU may equal 260.4 ns, as previously described.

The three ATUs corresponding to the temporal delay periods 300(1)-300(3) in each of the plurality of unique temporal delay patterns 206(1)-206(N) define three temporal delays to be injected into each of the plurality of communications signals 212(1)-212(N) during the temporal delay periods 300(1)-300(3). For example, the three ATUs corresponding to the temporal delay periods 300(1)-300(3) of the unique temporal delay pattern 206(1) are 0TU, 2TU, and 4TU, respectively. Similarly, the three ATUs corresponding to the temporal delay periods 300(1)-300(3) of the unique temporal delay pattern 206(2) are 4TU, 0TU, and 2TU, respectively. Likewise, the three ATUs corresponding to the temporal delay periods 300(1)-300(3) of the unique temporal delay pattern 206(N) are 0TU, 2TU, and 2TU, respectively. In a non-limiting example, the plurality of unique temporal delay patterns 206(1)-206(N) may be repeated in the one or more intervals 502(1)-502(3) for improved reliability.

FIG. 5B is a table 504 providing an exemplary illustration of determining the plurality of unique temporal delay patterns 206(1)-206(N) of FIG. 2 based on propagation delays of the plurality of delayed communications signals 212'(1)-212'(N). Common elements between FIGS. 2, 3, 5A, and 5B are shown therein with common element numbers and will not be re-described herein. For the convenience of illustration, FIG. 5B is discussed herein with reference to the plurality of delayed uplink communications signals 212U'(1)-212U'(N). It shall be appreciated that the working principles discussed herein can be applied to the plurality of delayed downlink communications signals 212D'(1)-212D'(N) as well. The table 504 includes a first column 506, a second column 508, a third column 510, a fourth column 512, and a fifth column 514. The table 504 also includes a plurality of rows 516(1)-516(N) corresponding respectively to the plurality of remote units 204(1)-204(N) and the plurality of unique temporal delay patterns 206(1)-206(N). The rows 516(1), 516(2), and 516(N) are discussed herein as non-limiting examples.

With reference to FIG. 5B, the first column 506 indicates that the rows 516(1), 516(2), and 516(N) correspond respectively to the client devices 226 associated with the remote units 204(1), 204(2), and 204(N), respectively. The second column 508 indicates that the client devices 226 associated with the remote units 204(1), 204(2), and 204(N) are assigned respective TAs of 23TU, 13TU, and 24TU, respectively. The third column 510 indicates the uplink propagation delays of the delayed uplink communications signals 212U'(1), 212U'(2), and 212U'(N) during the three temporal delay periods 300(1)-300(3). The third column 510 in row 516(1) indicates that the delayed uplink communications signal 212U'(1) has uplink respective propagation delays of 23TU, 25TU, and 27TU during the three temporal delay periods 300(1)-300(3), respectively. By subtracting the respective TA of 23TU from each of the respective uplink propagation delays of 23TU, 25TU, and 27TU, the fourth column 512 in row 516(1) indicates that the ATAs during the three temporal delay periods 300(1)-300(3) are 0TU, 2TU, and 4TU, respectively. As shown in table 500, the ATAs of 0TU, 2TU, and 4TU correspond to the unique temporal delay pattern 206(1), which is assigned to the remote unit 204(1) as indicated by the fifth column 514. Hence, the remote unit 204(1) can be identified based on the unique temporal delay pattern 206(1) associated with the delayed uplink communications signal 212U'(1). As previously discussed in FIG. 2, the determination unit 216 may determine the predefined physical location of each of the plurality of remote units 204(1)-204(N) based the identification of the remote unit. As such, the predefined physical location of the remote unit 204(1) can be determined. Furthermore, in a non-limiting example, it is also possible to locate the client device 226 associated with the remote unit 204(1) based on the predefined physical location of the remote unit 204(1).

With continuing reference to FIG. 5B, the third column 510 in row 516(2) indicates that the delayed uplink communications signal 212U'(2) has respective uplink propagation delays of 17TU, 13TU, and 15TU during the three temporal delay periods 300(1)-300(3), respectively. By subtracting the respective TA of 13TU from each of the respective uplink propagation delays of 17TU, 13TU, and 15TU, the fourth column 512 in row 516(2) indicates that the ATAs during the three temporal delay periods 300(1)-300(3) are 4TU, 0TU, and 2TU, respectively. As shown in table 500, the ATAs of 4TU, 0TU, and 2TU correspond to the unique temporal delay pattern 206(2), which is assigned to the remote unit 204(2) as indicated by the fifth column 514. Hence, the remote unit 204(2) can be identified based on the unique temporal delay pattern 206(2) associated with the delayed uplink communications signal 212U'(2). Furthermore, in another non-limiting example, it is also possible to locate the client device 226 associated with the remote unit 204(2) based on the predefined physical location of the remote unit 204(2).

With continuing reference to FIG. 5B, the third column 510 in row 516(N) indicates that the delayed uplink communications signal 212U'(N) has respective uplink propagation delays of 24TU, 26TU, and 26TU during the three temporal delay periods 300(1)-300(3), respectively. By subtracting the respective TA of 24TU from each of the respective uplink propagation delays of 24TU, 26TU, and 26TU, the fourth column 512 in row 516(N) indicates that the ATAs during the three temporal delay periods 300(1)-300(3) are 0TU, 2TU, and 2TU, respectively. As shown in table 500, the ATAs of 0TU, 2TU, and 2TU correspond to the unique temporal delay pattern 206(N), which is assigned to the remote unit 204(N) as indicated by the fifth column 514. Hence, the remote unit 204(N) can be identified based on the unique temporal delay pattern 206(N) associated with the delayed uplink communications signal 212U'(N). Furthermore, in another non-limiting example, it is also possible to locate the client device 226 associated with the remote unit 204(N) based on the predefined physical location of the remote unit 204(N).

Figure 6:
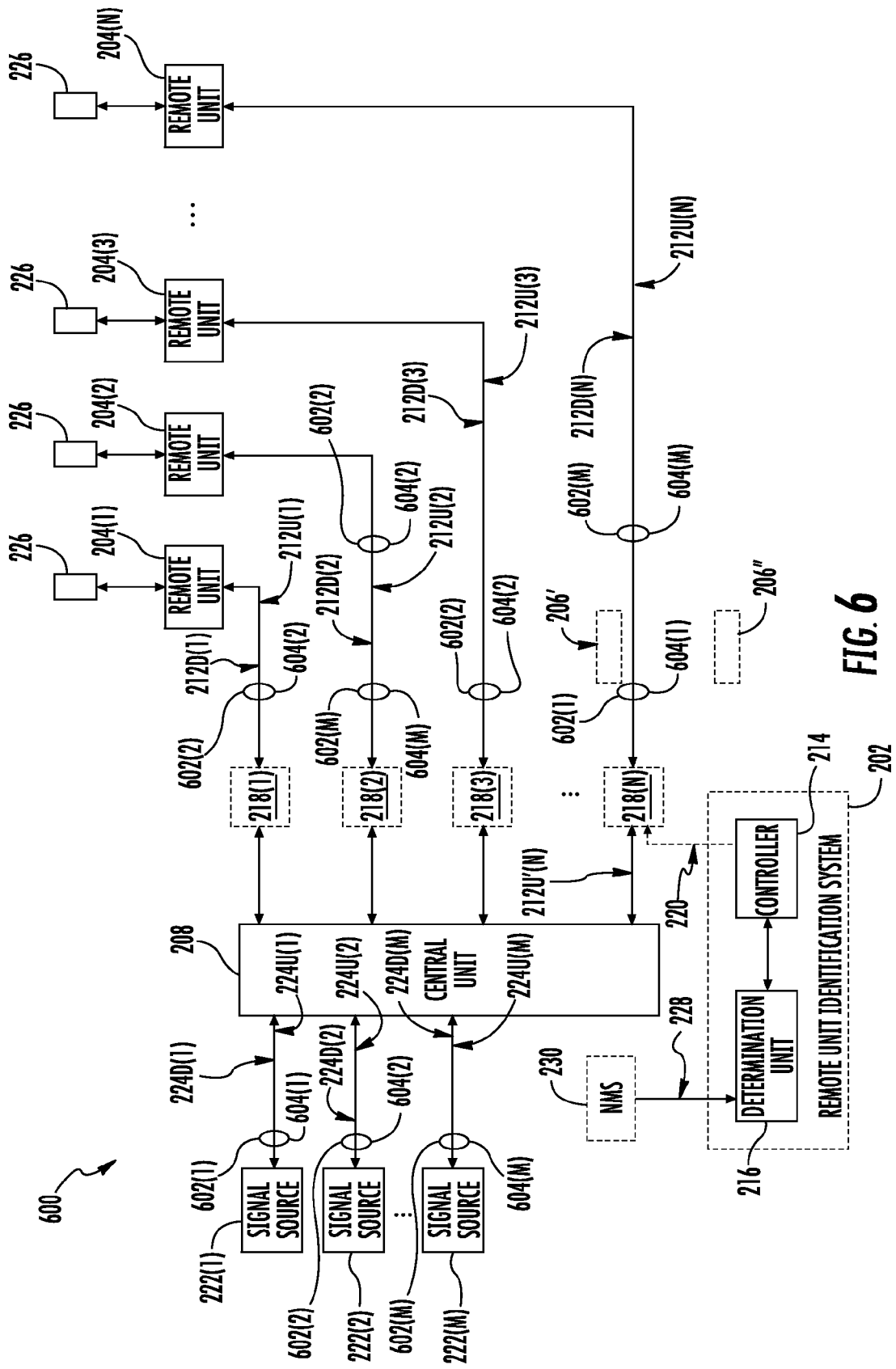
FIG. 6 is a schematic diagram of an exemplary WDS configured to uniquely identify at least one remote unit among the plurality of remote units of FIG. 2 communicating in a specific radio frequency (RF) band based on at least one unique temporal delay pattern assigned to the RF band.

With reference back to FIG. 2, the one or more downlink RF communications signals 224D(1)-224D(M) and the one or more uplink RF communications signals 224U(1)-224U(M) may be communicated with the one or more signal sources 222(1)-222(M) on different RF bands and/or channels. In some aspects, it may be desired to identify at least one remote unit among the plurality of remote units 204(1)-204(N) that communicates in a specific RF band and/or channel. In this regard, FIG. 6 is a schematic diagram of an exemplary WDS 600 configured to uniquely identify at least one remote unit among the plurality of remote units 204(1)-204(N) of FIG. 2 communicating in a specific RF band based on at least one unique temporal delay pattern assigned to an RF band. Common elements between FIGS. 2 and 6 are shown therein with common element numbers and will not be re-described herein.

With reference to FIG. 6, the one or more signal sources 222(1)-222(M) may communicate the one or more downlink RF communications signals 224D(1)-224D(M) and the one or more uplink RF communications signals 224U(1)-224U(M) in one or more RF bands 602(1)-602(M), respectively. The one or more signal sources 222(1)-222(M) may also communicate the one or more downlink RF communications signals 224D(1)-224D(M) and the one or more uplink RF communications signals 224U(1)-224U(M) in one or more RF channels 604(1)-604(M), respectively. For example, the signal source 222(1) communicates the downlink RF communications signal 224D(1) and the uplink RF communications signal 224U(1) with the central unit 208 on the RF band 602(1) or the RF channel 604(1). The signal source 222(2) communicates the downlink RF communications signal 224D(2) and the uplink RF communications signal 224U(2) with the central unit 208 on the RF band 602(2) or the RF channel 604(2). The signal source 222(M) communicates the downlink RF communications signal 224D(M) and the uplink RF communications signal 224U(M) with the central unit 208 on the RF band 602(M) or the RF channel 604(M). The central unit 208 communicates the one or more downlink RF communications signals 224D(1)-224D(M) to the plurality of remote units 204(1)-204(N) as the plurality of downlink communications signals 212D(1)-212D(N). The central unit 208 also provides the plurality of uplink communications signals 212U(1)-212U(N) received from the plurality of remote units 204(1)-204(N) to the one or more signal sources 222(1)-222(M) as the one or more uplink RF communications signals 224U(1)-224U(M). In this regard, the plurality of downlink communications signals 212D(1)-212D(N) and the plurality of uplink communications signals 212U(1)-212U(N) communicated between the central unit 208 and the plurality of remote units 204(1)-204(N) may occupy different RF bands or channels.

In a non-limiting example, the central unit 208 may communicate the downlink communications signal 212D(1) and the uplink communications signal 212U(1) with the remote unit 204(1) in the RF band 602(2) or the RF channel 604(2). The central unit 208 may communicate the downlink communications signal 212D(2) and the uplink communications signal 212U(2) with the remote unit 204(2) in the RF bands 602(2) and 602(M) or the RF channels 604(2) and 604(M). The central unit 208 may communicate the downlink communications signal 212D(N) and the uplink communications signal 212U(N) with the remote unit 204(N) in the RF bands 602(1) and 602(M) or the RF channels 604(1) and 604(M).

To identify a remote unit among the plurality of remote units 204(1)-204(N) communicating on a specific RF band, for example the RF band 602(1), among the one or more RF bands 602(1)-602(M), the controller 214 assigns at least one unique temporal delay pattern 206' to the RF band 602(1). The unique temporal delay pattern 206' can be any of the plurality of unique temporal delay patterns 206(1)-206(N) as previously discussed. The controller 214 may configure at least one delay element among the plurality of delay elements 218(1)-218(N) to digitally delay at least one communications signal among the plurality of communications signals 212(1)-212(N) based on the unique temporal delay pattern 206'. In a non-limiting example, the controller 214 may control the delay element 218(N) to digitally delay the communications signal 212(N) based on the unique temporal delay pattern 206' to provide a delayed communications signal 212'(N). According to previous discussions in FIGS. 2-5B, the determination unit 216 is able to determine the unique temporal delay pattern 206' associated with the RF band 602(1) in the delayed communications signal 212'(N). The determination unit 216 can then identify the remote unit 204(N) among the plurality of remote units 204(1)-204(N) based on the determined unique temporal delay pattern 206'.

With continuing reference to FIG. 6, to identify a remote unit among the plurality of remote units 204(1)-204(N) communicating on a specific RF channel, for example the RF channel 604(1), among the one or more RF channels 604(1)-604(M), the controller 214 assigns at least one unique temporal delay pattern 206" to the RF channel 604(1). The unique temporal delay pattern 206" can be any of the plurality of unique temporal delay patterns 206(1)-206(N) as previously discussed. The controller 214 may configure at least one delay element among the plurality of delay elements 218(1)-218(N) to digitally delay at least one communications signal among the plurality of communications signals 212(1)-212(N) based on the unique temporal delay pattern 206'. In a non-limiting example, the controller 214 may control the delay element 218(N) to digitally delay the downlink communications signal 212D(N) and/or the uplink communications signal 212U(N) based on the unique temporal delay pattern 206" to provide the delayed downlink communications signal 212D'(N) and/or the delayed uplink communications signal 212U'(N). According to previous discussions in FIGS. 2-5B, the determination unit 216 is able to determine the unique temporal delay pattern 206" associated with the RF channel 604(1) in the delayed downlink communications signal 212D'(N) and/or the delayed uplink communications signal 212U'(N). The determination unit 216 can then identify the remote unit 204(N) among the plurality of remote units 204(1)-204(N) based on the determined unique temporal delay pattern 206".

Figure 7:
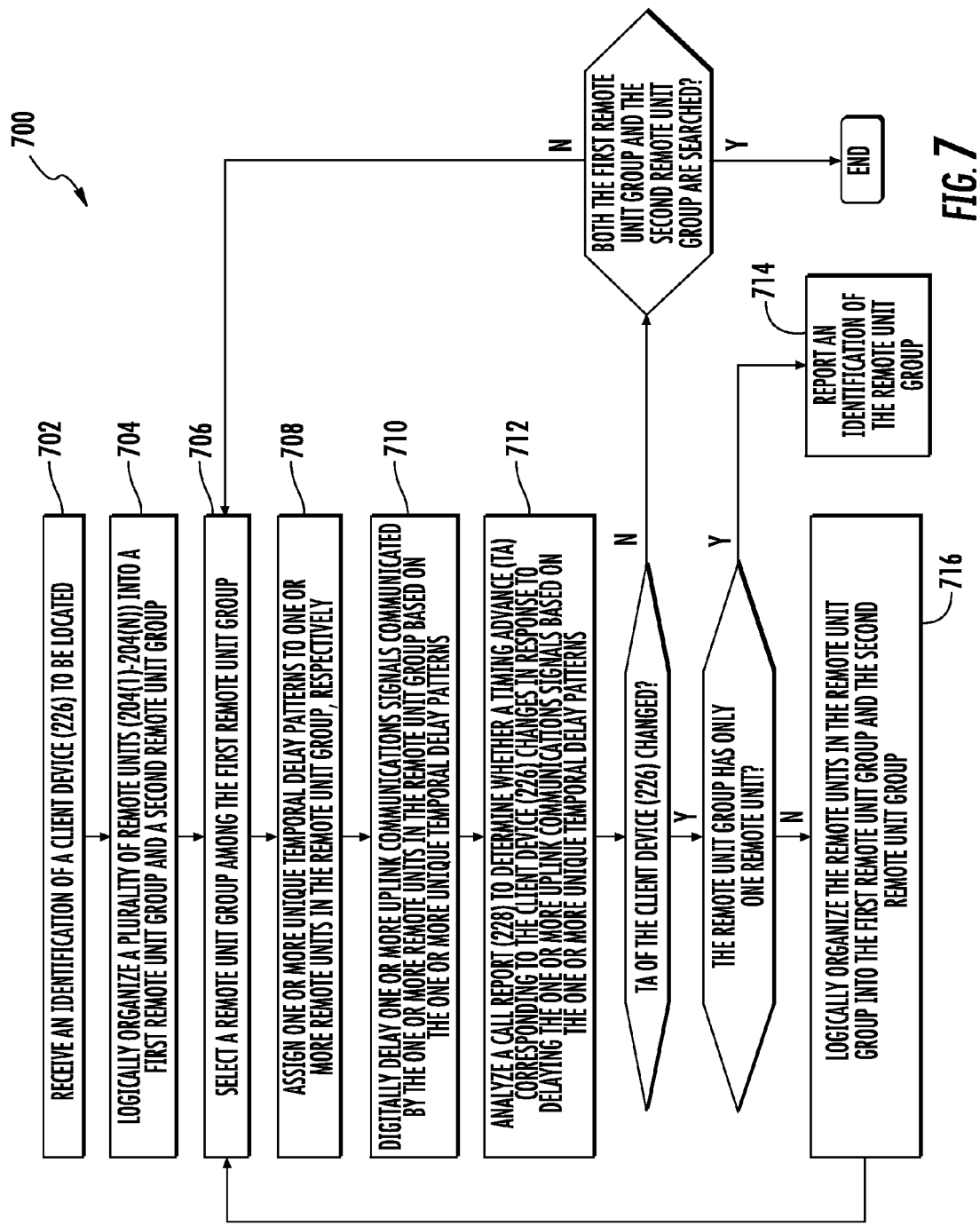
FIG. 7 is a flowchart of an exemplary client device location process for identifying a client device relative to a remote unit in the WDSs of FIGS. 2 and 6 based on an identification of the client device.

In some situations, such as receiving an E911 call from a client device among the client devices 226 of FIGS. 2 and 6, it may be necessary to locate the client device 226 in the WDS 200 of FIG. 2 and the WDS 600 of FIG. 6 based on an identification of the client device 226. In this regard, FIG. 7 is a flowchart of an exemplary client device location process 700 for identifying a client device in the WDS 200 of FIG. 2 and the WDS 600 of FIG. 6 based on an identification of the client device 226. In a non-limiting example, location of the client device 226 may be useful for supporting location-based services (LBS), network optimization, evaluation of key performance indication (KPI) statistic report, and self-organized network (SON) operations. For the convenience of illustration, FIG. 7 is discussed herein with reference to the plurality of uplink communications signals 212U(1)-212U(N). It shall be appreciated that the working principles discussed herein are applicable to plurality of downlink communications signals 212D(1)-212D(N) as well.

With reference to FIG. 7, the identification of the client device 226 to be located is received by the remote unit identification system 202 (block 702). In some cases, the WDSs 200 and the 600 may include hundreds of remote units 204(1)-204(N). In this regard, a binary-tree search algorithm may be adopted to expedite the client device location process 700. Accordingly, the remote unit identification system 202 may logically organize the plurality of remote units 204(1)-204(N) into a first remote unit group and a second remote unit group (block 704). In a non-limiting example, the first remote unit group and the second remote unit group may include the same number of remote units if there is even number of remote units among the plurality of remote units 204(1)-204(N). In another non-limiting example, one of the first remote unit group and the second remote unit group may include one additional remote unit if there is odd number of remote units among the plurality of remote units 204(1)-204(N).

A remote group is then selected among the first remote unit group and the second remote unit group (block 706). The controller 214 then assigns one or more unique temporal delay patterns, which may be among the plurality of unique temporal delay patterns 206(1)-206(N), to the one or more remote units in the remote unit group, respectively (block 708). The controller 214 then configures one or more delay elements, which may be among the plurality of the delay elements 218(1)-218(N), to digitally delay one or more uplink communications signals, which may be among the plurality of uplink communications signals 212U(1)-212U(N), communicated by the one or more remote units in the remote unit group based on the one or more unique temporal delay patterns (block 710). The determination unit 216 then analyzes the call report 228 to determine whether a TA corresponding to the client device 226 changes in response to delaying the one or more uplink communications signals based on the one or more unique temporal delay patterns (block 712).

If the TA corresponding to the client device 226 has changed, and the remote unit group includes only one remote unit, the remote unit identification system 202 reports an identification of the remote unit in the remote unit group as the location of the client device 226 (block 714) and the client device location process 700 ends. If the TA corresponding to the client device 226 has changed, and the remote unit group includes more than one remote unit, the remote unit identification system 202 logically organizes remote units in the remote unit group into the first remote unit group and the second remote unit group (block 716) and returns to block 706. If the TA of the client device 226 does not change in delaying the one or more uplink communications signals based on the one or more unique temporal delay patterns, the client device 226 is not associated with any remote unit in the remote unit group. In this case, if both of the first remote unit group and the second remote unit group have been searched, the client device location process 700 will end. Otherwise, the client device location process 700 returns to block 706.

Figure 8:
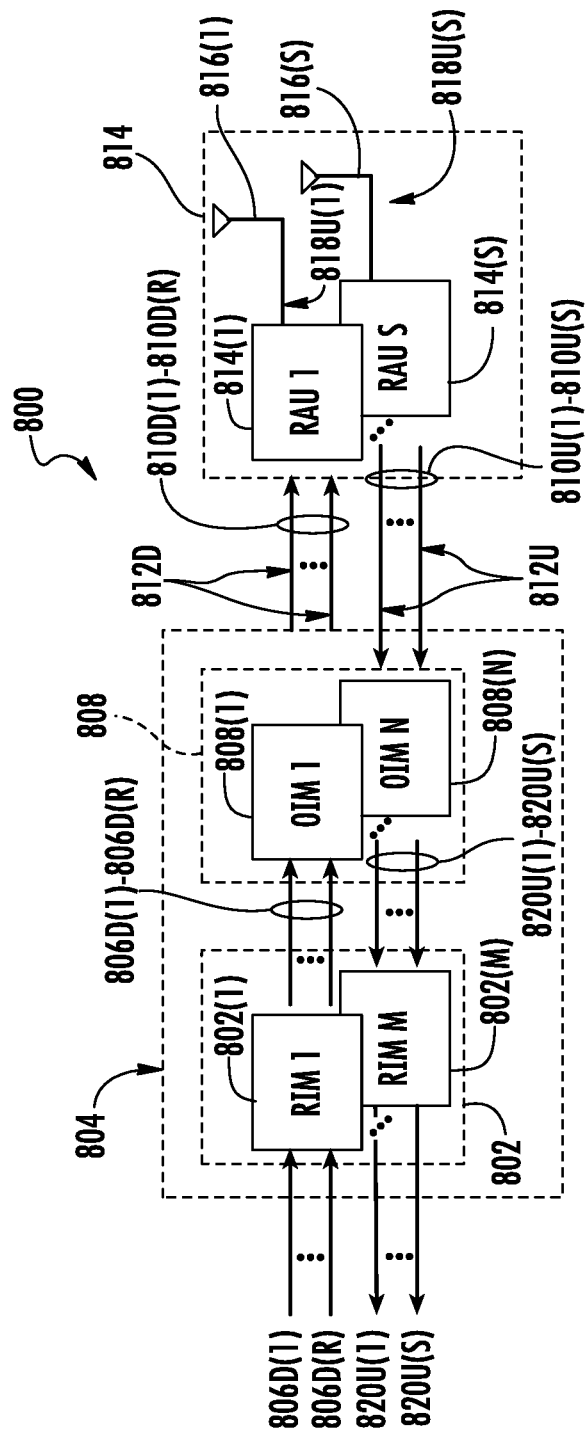
FIG. 8 is a schematic diagram of an exemplary WDS that can be configured to function as the WDSs of FIGS. 2 and 6.

FIG. 8 is a schematic diagram of an exemplary WDS 800 that can be configured to function as the WDS 200 of FIG. 2 and the WDS 600 of FIG. 6. In this example, the WDS 800 is an optical fiber-based WDS. The WDS 800 includes an optical fiber for distributing communications services for multiple frequency bands. The WDS 800 in this example is comprised of three main components. One or more radio interfaces provided in the form of radio interface modules (RIMs) 802(1)-802(M) are provided in a central unit 804 to receive and process downlink electrical communications signals 806D(1)-806D(R) prior to optical conversion into downlink optical fiber-based communications signals. The downlink electrical communications signals 806D(1)-806D(R) may be received from a base station as an example. The RIMs 802(1)-802(M) provide both downlink and uplink interfaces for signal processing. The notations "1-R" and "1-M" indicate that any number of the referenced component, 1-R and 1-M, respectively, may be provided. The central unit 804 is configured to accept the plurality of RIMs 802(1)-802(M) as modular components that can easily be installed and removed or replaced in the central unit 804. In one example, the central unit 804 is configured to support up to twelve RIMs 802(1)-802(12). Each RIM 802(1)-802(M) can be designed to support a particular type of radio source or range of radio sources (i.e., frequencies) to provide flexibility in configuring the central unit 804 and the WDS 800 to support the desired radio sources.

For example, one RIM 802 may be configured to support the Personal Communication Services (PCS) radio band. Another RIM 802 may be configured to support the 800 MHz radio band. In this example, by inclusion of these RIMs 802, the central unit 804 could be configured to support and distribute communications signals on both PCS and LTE 700 radio bands, as an example. RIMs 802 may be provided in the central unit 804 that support any frequency bands desired, including but not limited to the US Cellular band, PCS band, Advanced Wireless Services (AWS) band, 700 MHz band, Global System for Mobile communications (GSM) 900, GSM 1800, and Universal Mobile Telecommunications System (UMTS). The RIMs 802(1)-802(M) may also be provided in the central unit 804 that support any wireless technologies desired, including but not limited to Code Division Multiple Access (CDMA), CDMA200, 1×RTT, Evolution —Data Only (EV-DO), UMTS, Highspeed Packet Access (HSPA), GSM, General Packet Radio Services (GPRS), Enhanced Data GSM Environment (EDGE), Time Division Multiple Access (TDMA), Long Term Evolution (LTE), iDEN, and Cellular Digital Packet Data (CDPD).

The RIMs 802(1)-802(M) may be provided in the central unit 804 that support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 8, the downlink electrical communications signals 806D(1)-806D(R) are provided to a plurality of optical interfaces provided in the form of optical interface modules (OIMs) 808(1)-808(N) in this embodiment to convert the downlink electrical communications signals 806D(1)-806D(R) into downlink optical fiber-based communications signals 810D(1)-810D(R). The notation "1-N" indicates that any number of the referenced component 1-N may be provided. The OIMs 808 may be configured to provide one or more optical interface components (OICs) that contain optical to electrical (O/E) and electrical to optical (E/O) converters, as will be described in more detail below. The OIMs 808 support the radio bands that can be provided by the RIMs 802, including the examples previously described above.

The OIMs 808(1)-808(N) each include E/O converters to convert the downlink electrical communications signals 806D(1)-806D(R) into the downlink optical fiber-based communications signals 810D(1)-810D(R). The downlink optical fiber-based communications signals 810D(1)-810D(R) are communicated over a downlink optical fiber-based communications medium 812D to a plurality of remote units 814(1)-814(S), which may be remote antenna units ("RAUs 814(1)-814(S)"). The notation "1-S" indicates that any number of the referenced component 1-S may be provided. O/E converters provided in the RAUs 814(1)-814(S) convert the downlink optical fiber-based communications signals 810D(1)-810D(R) back into the downlink electrical communications signals 806D(1)-806D(R), which are provided to antennas 816(1)-816(S) in the RAUs 814(1)-814(S) to client devices in the reception range of the antennas 816(1)-816(S).

E/O converters are also provided in the RAUs 814(1)-814(S) to convert uplink electrical communications signals 818U(1)-818U(S) received from client devices through the antennas 816(1)-816(S) into uplink optical fiber-based communications signals 810U(1)-810U(S). The RAUs 814(1)-814(S) communicate the uplink optical fiber-based communications signals 810U(1)-810U(S) over an uplink optical fiber-based communications medium 812U to the OIMs 808(1)-808(N) in the central unit 804. The OIMs 808(1)-808(N) include O/E converters that convert the received uplink optical fiber-based communications signals 810U(1)-810U(S) into uplink electrical communications signals 820U(1)-820U(S), which are processed by the RIMs 802(1)-802(M) and provided as uplink electrical communications signals 820U(1)-820U(S). The central unit 804 may provide the uplink electrical communications signals 820U(1)-820U(S) to a base station or other communications system.

Note that the downlink optical fiber-based communications medium 812D and the uplink optical fiber-based communications medium 812U connected to each RAU 814(1)-814(S) may be a common optical fiber-based communications medium, wherein for example, wave division multiplexing (WDM) may be employed to provide the downlink optical fiber-based communications signals 810D(1)-810D(R) and the uplink optical fiber-based communications signals 810U(1)-810U(S) on the same optical fiber-based communications medium.

Figure 9:
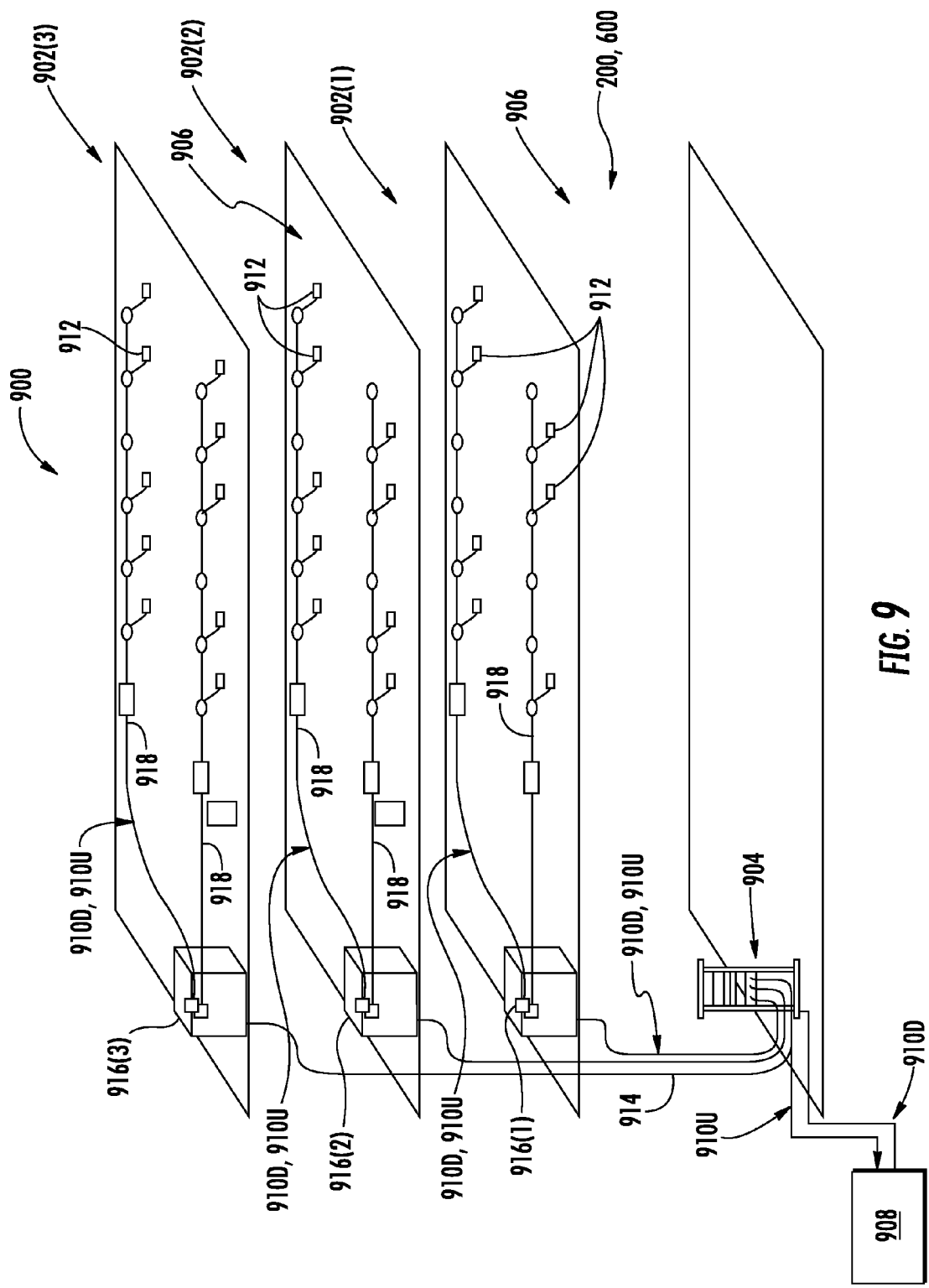
FIG. 9 is a partial schematic cut-away diagram of an exemplary building infrastructure in which the WDSs of FIGS. 2 and 6 can be employed.

The WDS 200 of FIG. 2 and the WDS 600 of FIG. 6 may be provided in an indoor environment, as illustrated in FIG. 9. FIG. 9 is a partial schematic cut-away diagram of an exemplary building infrastructure 900 in which the WDS 200 of FIG. 2 and the WDS 600 of FIG. 6 can be employed. The building infrastructure 900 in this embodiment includes a first (ground) floor 902(1), a second floor 902(2), and a third floor 902(3). The floors 902(1)-902(3) are serviced by a central unit 904 to provide antenna coverage areas 906 in the building infrastructure 900. The central unit 904 is communicatively coupled to a base station 908 to receive downlink communications signals 910D from the base station 908. The central unit 904 is communicatively coupled to a plurality of remote units 912 to distribute the downlink communications signals 910D to the plurality of remote units 912 and to receive uplink communications signals 910U from the plurality of remote units 912, as previously discussed above. The downlink communications signals 910D and the uplink communications signals 910U communicated between the central unit 904 and the plurality of remote units 912 are carried over a riser cable 914. The riser cable 914 may be routed through interconnect units (ICUs) 916(1)-916(3) dedicated to each of the floors 902(1)-902(3) that route the downlink communications signals 910D and the uplink communications signals 910U to the plurality of remote units 912 and also provide power to the plurality of remote units 912 via array cables 918.

Figure 10:
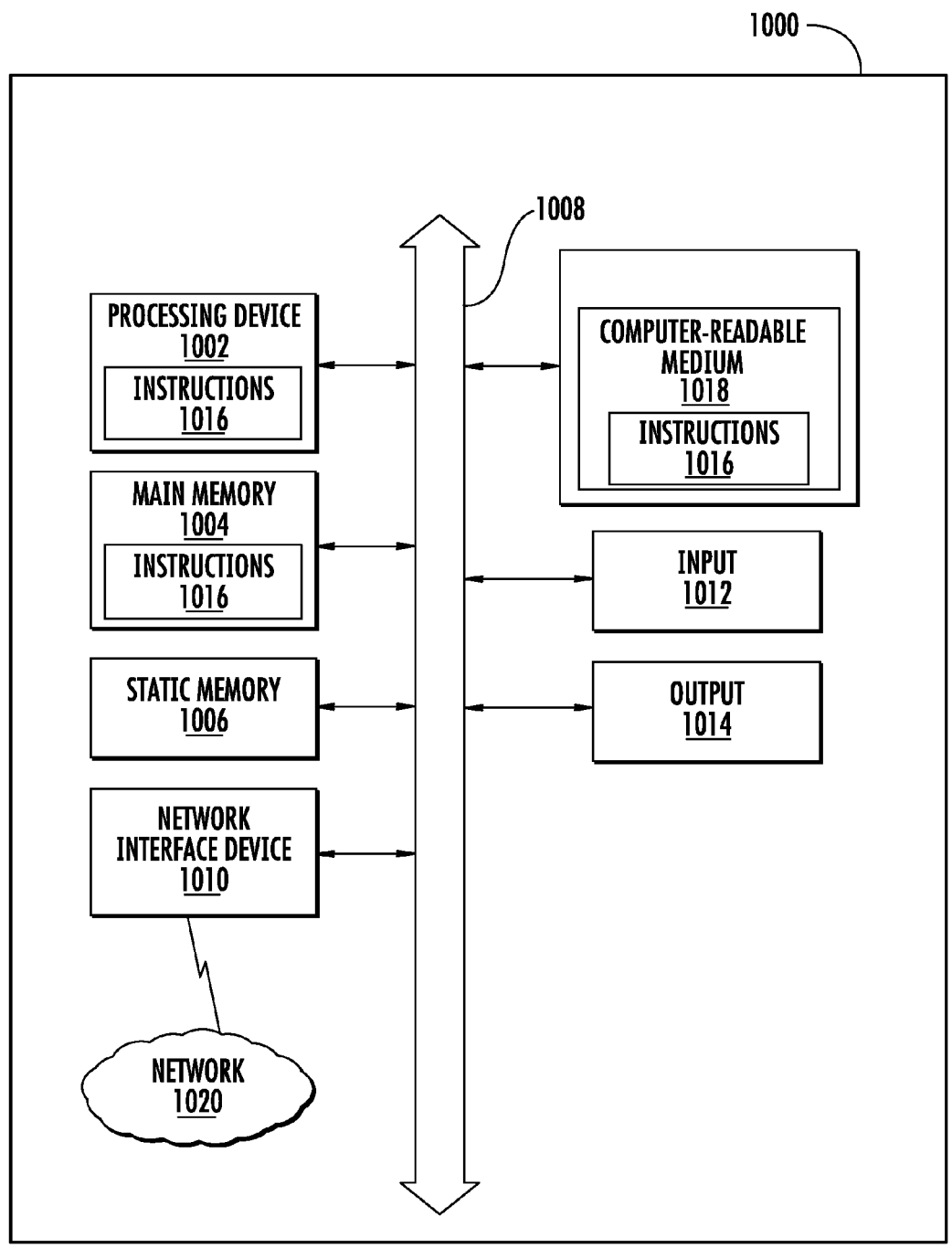
FIG. 10 is a schematic diagram of a generalized representation of an exemplary controller that can be included in the WDSs of FIGS. 2 and 6 to identify the plurality of remote units in the WDSs of FIGS. 2 and 6, wherein an exemplary computer system is adapted to execute instructions from an exemplary computer-readable medium.

FIG. 10 is a schematic diagram illustrating additional details of an exemplary computer system 1000 that could be employed in the controllers discussed above, including, but not limited to, the remote unit identification system 202 of FIGS. 2 and 6. As discussed above, the remote unit identification system 202 of FIG. 2 is configured to uniquely identify the plurality of remote units 204(1)-204(N) in the WDS 200 based on the plurality of unique temporal delay patterns 206(1)-206(N). The remote unit identification system 202 of FIG. 6 is configured to uniquely identify at least one remote unit among the plurality of remote units 204(1)-204(N) in the WDS 600 based on at least one unique temporal delay pattern assigned to at least one RF band or at least one RF channel. In this regard, the computer system 1000 is adapted to execute instructions from an exemplary computer-readable medium to perform these and/or any of the functions or processing described herein.

With reference to FIG. 10, the computer system 1000 may include a set of instructions that may be executed to uniquely identify the plurality of remote units 204(1)-204(N) in the WDSs 200 and 600. The computer system 1000 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 1000 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server or a user's computer.

The computer system 1000 in this embodiment includes a processing circuit ("processor 1002"), a main memory 1004 (e.g., read-only memory (ROM), flash memory, dynamic random access memory (DRAM), such as synchronous DRAM (SDRAM), etc.), and a static memory 1006 (e.g., flash memory, static random access memory (SRAM), etc.), which may communicate with each other via a data bus 1008. Alternatively, the processor 1002 may be connected to the main memory 1004 and/or the static memory 1006 directly or via some other connectivity bus or connection. The main memory 1004 and the static memory 1006 may be any type of memory.

The processor 1002 may be a microprocessor, central processing unit, or the like. More particularly, the processor 1002 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 1002 is configured to execute processing logic in instructions for performing the operations and steps discussed herein.

The computer system 1000 may further include a network interface device 1010. The computer system 1000 also may or may not include an input 1012, configured to receive input and selections to be communicated to the computer system 1000 when executing instructions. The computer system 1000 also may or may not include an output 1014, including, but not limited to, a display, a video display unit (e.g., a liquid crystal display (LCD) or a cathode ray tube (CRT)), an alphanumeric input device (e.g., a keyboard), and/or a cursor control device (e.g., a mouse).

The computer system 1000 may or may not include a data storage device that includes instructions 1016 stored in a computer-readable medium 1018. The instructions 1016 may also reside, completely or at least partially, within the main memory 1004 and/or within the processor 1002 during execution thereof by the computer system 1000, the main memory 1004 and the processor 1002 also constituting the computer-readable medium 1018. The instructions 1016 may further be transmitted or received over a network 1020 via the network interface device 1010.

While the computer-readable medium 1018 is shown in an exemplary embodiment to be a single medium, the term "computer-readable medium" should be taken to include a single medium or multiple mediums (e.g., a centralized or distributed database, and/or associated caches and servers) that store the one or more sets of instructions. The term "computer-readable medium" shall also include any medium that is capable of storing, encoding, or carrying a set of instructions for execution by the processing device and that cause the processing device to perform any one or more of the methodologies of the embodiments disclosed herein. The term "computer-readable medium" shall accordingly include, but not be limited to, solid-state memories, optical mediums, and magnetic mediums.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.), and the like.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

Various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A wireless distribution system (WDS), comprising:
   a plurality of signal paths;
   a plurality of remote units, each remote unit among the plurality of remote units communicatively coupled to a respective signal path among the plurality of signal paths;
   a central unit configured to communicate a respective communications signal among a plurality of communications signals to each remote unit among the plurality of remote units in the respective signal path communicatively coupled to the remote unit;
   a plurality of delay elements disposed in the plurality of signal paths, respectively, wherein each delay element among the plurality of delay elements is configured to digitally delay the respective communications signal communicated in the respective signal path according to a respective unique temporal delay pattern among a plurality of unique temporal delay patterns assigned to a respective remote unit among the plurality of remote units communicatively coupled to the respective signal path to provide a delayed communications signal in the respective signal path; and
   a remote unit identification system, comprising:
      a controller configured to assign the plurality of unique temporal delay patterns to the plurality of remote units in the WDS; and
      a determination unit configured to:
         for at least one delayed communications signal provided in at least one signal path among the plurality of signal paths:

determine a unique temporal delay pattern associated with the at least one delayed communications signal; and
identify a remote unit among the plurality of remote units communicatively coupled to the at least one signal path based on the unique temporal delay pattern.

2. The WDS of claim 1, further comprising a plurality of uplink signal paths, wherein:
each remote unit among the plurality of remote units is communicatively coupled to a respective uplink signal path among the plurality of uplink signal paths;
the central unit is further configured to receive a respective uplink communications signal among a plurality of uplink communications signals from each remote unit among the plurality of remote units in the respective uplink signal path communicatively coupled to the remote unit;
each delay element among the plurality of delay elements is further configured to digitally delay the respective uplink communications signal communicated in the respective uplink signal path according to the unique temporal delay pattern assigned to the respective remote unit communicatively coupled to the respective uplink signal path to provide a delayed uplink communications signal in the respective uplink signal path; and
the determination unit is further configured to:
for at least one delayed uplink communications signal provided in at least one uplink signal path among the plurality of uplink signal paths:
determine a unique temporal delay pattern associated with the at least one delayed uplink communications signal; and
identify a remote unit among the plurality of remote units communicatively coupled to the at least one uplink signal path based on the unique temporal delay pattern.

3. The WDS of claim 1, further comprising a plurality of downlink signal paths, wherein:
each remote unit among the plurality of remote units is communicatively coupled to a respective downlink signal path among the plurality of downlink signal paths;
the central unit is further configured to communicate a respective downlink communications signal among a plurality of downlink communications signals to each remote unit among the plurality of remote units over the respective downlink signal path communicatively coupled to the remote unit;
each delay element among the plurality of delay elements is further configured to digitally delay the respective downlink communications signal communicated in the respective downlink signal path according to the unique temporal delay pattern assigned to the respective remote unit communicatively coupled to the respective downlink signal path to provide a delayed downlink communications signal in the respective downlink signal path; and
the determination unit is further configured to:
for at least one delayed downlink communications signal provided in at least one downlink signal path among the plurality of downlink signal paths:
determine a unique temporal delay pattern associated with the at least one delayed downlink communications signal; and
identify a remote unit among the plurality of remote units communicatively coupled to the at least one downlink signal path based on the unique temporal delay pattern.

4. The WDS of claim 1, further comprising a plurality of downlink signal paths and a plurality of uplink signal paths, wherein:
each remote unit among the plurality of remote units is communicatively coupled to a respective downlink signal path among the plurality of downlink signal paths and a respective uplink signal path among the plurality of uplink signal paths;
the central unit is further configured to:
communicate a respective downlink communications signal among a plurality of downlink communications signals with each remote unit among the plurality of remote units in the respective downlink signal path communicatively coupled to the remote unit; and
communicate a respective uplink communications signal among a plurality of uplink communications signals with each remote unit among the plurality of remote units in the respective uplink signal path communicatively coupled to the remote unit; and
each delay element among the plurality of delay elements is further configured to:
digitally delay the respective downlink communications signal communicated in the respective downlink signal path according to the unique temporal delay pattern assigned to the respective remote unit communicatively coupled to the respective downlink signal path to provide a delayed downlink communications signal in the respective downlink signal path; and
digitally delay the respective uplink communications signal communicated in the respective uplink signal path according to the unique temporal delay pattern assigned to the respective remote unit communicatively coupled to the respective uplink signal path to provide a delayed uplink communications signal in the respective uplink signal path; and
the determination unit is further configured to:
for at least one delayed downlink communications signal provided in at least one downlink signal path among the plurality of downlink signal paths and at least one delayed uplink communications signal provided in at least one uplink signal path among the plurality of uplink signal paths:
determine a unique temporal delay pattern associated with the at least one delayed downlink communications signal and the at least one delayed uplink communications signal; and
identify a remote unit among the plurality of remote units communicatively coupled to the at least one downlink signal path and the at least one uplink signal path based on the unique temporal delay pattern.

5. The WDS of claim 1, wherein:
each unique temporal delay pattern among the plurality of unique temporal delay patterns comprises a plurality of temporal delay periods corresponding to a plurality of temporal delay values, respectively; and
a sequence of the plurality of temporal delay values makes each unique temporal delay pattern among the plurality of unique temporal delay patterns uniquely distinguishable from rest of the plurality of unique temporal delay patterns.

6. The WDS of claim 5, wherein each of the plurality of temporal delay values in each of the plurality of unique temporal delay patterns is a multiple of a predefined temporal unit (TU).

7. The WDS of claim 5, wherein each delay element among the plurality of delay elements is configured to digitally delay the communications signal communicated in the respective signal path for the plurality of temporal delay values in the plurality of temporal delay periods associated with the respective unique temporal delay pattern, respectively, to provide the respective communications signal.

8. The WDS of claim 5, wherein the determination unit is further configured to determine the unique temporal delay pattern associated with the at least one delayed communications signal based on the plurality of temporal delay values associated with the at least one delayed communications signal in the plurality of temporal delay periods, respectively.

9. The WDS of claim 1, wherein:
the central unit is communicatively coupled to one or more signal sources configured to communicate one or more radio frequency (RF) communications signals associated with one or more RF bands;
the central unit is further configured to communicate the one or more RF communications signals as the plurality of communications signals over the plurality of signal paths;
the controller is further configured to assign at least one unique temporal delay pattern to at least one RF band among the one or more RF bands associated with at least one communications signal among the plurality of communications signals;
at least one delay element among the plurality of delay elements is further configured to digitally delay the at least one communications signal based on the at least one unique temporal delay pattern to provide the at least one delayed communications signal in the at least one signal path among the plurality of signal paths; and
the determination unit is further configured to:
 determine the at least one unique temporal delay pattern associated with the at least one RF band in the at least one delayed communications signal in the at least one signal path; and
 identify at least one remote unit among the plurality of remote units communicatively coupled to the at least one signal path based on the at least one unique temporal delay pattern.

10. The WDS of claim 1, wherein the controller is further configured to programmably control each of the plurality of delay elements to digitally delay the respective communications signal according to the unique temporal delay pattern assigned to the respective remote unit to provide the delayed communications signal in the respective signal path.

11. The WDS of claim 1, wherein the central unit comprises:
a plurality of electrical-to-optical (E/O) converters configured to convert a plurality of downlink communications signals into downlink optical fiber-based communications signals for communication to the plurality of remote units over a downlink optical fiber-based communications medium; and
a plurality of optical-to-electrical (O/E) converters configured to convert uplink optical fiber-based communications signals received from the plurality of remote units over an uplink optical fiber-based communications medium into a plurality of uplink communications signals.

12. The WDS of claim 1, wherein the determination unit is further configured to determine a location of the identified remote unit.

13. The WDS of claim 12, wherein the determination unit is further configured to determine the location of the identified remote unit based on a predefined physical location associated with identified the remote unit.

14. The WDS of claim 12, wherein the determination unit is further configured to determine a location of a client device communicating the respective communications signal to the identified remote unit based on the location of the identified remote unit.

15. The WDS of claim 14, wherein the remote unit identification system is further configured to:
receive an identification of the client device;
logically organize the plurality of remote units in the WDS into a first remote unit group and a second remote unit group;
for each remote unit group among the first remote unit group and the second remote unit group:
 assign one or more unique temporal delay patterns to one or more remote units in the remote unit group, respectively;
 control one or more delay elements among the plurality of delay elements to delay one or more uplink communications signals communicated by the one or more remote units in the remote unit group based on the one or more unique temporal delay patterns, respectively;
 analyze a call report to determine whether a timing advance (TA) corresponding to the client device changes in response to delaying the one or more uplink communications signals based on the one or more unique temporal delay patterns; and
 if the TA of the client device has changed:
  if the remote unit group comprises only one remote unit, report the identification of the remote unit in the remote unit group; and
  if the remote unit group comprises more than one remote unit, logically organize the remote units in the remote unit group into the first remote unit group and the second remote unit group.

16. A method for identifying a client device in a wireless distribution system (WDS), comprising:
receiving an identification of the client device;
logically organizing a plurality of remote units in the WDS into a first remote unit group and a second remote unit group; and
for each remote unit group among the first remote unit group and the second remote unit group:
 assigning one or more unique temporal delay patterns to one or more remote units in the remote unit group, respectively;
 delaying one or more communications signals communicated with the one or more remote units in the remote unit group based on the one or more unique temporal delay patterns, respectively;
 analyzing a call report to determine whether a timing advance (TA) corresponding to the client device changes in response to delaying the one or more communications signals based on the one or more unique temporal delay patterns; and
 if the TA of the client device has changed:
  if the remote unit group comprises only one remote unit, reporting an identification of the remote unit in the remote unit group; and if the remote unit group comprises more than one remote unit, logically organizing the remote units in the remote unit group into the first remote unit group and the second remote unit group.

17. The method of claim 16, further comprising determining a location of the reported remote unit.

18. The method of claim 17, further comprising determining the location of the reported remote unit based on a predefined physical location associated with reported the remote unit.

19. The method of claim 17, further comprising determining a location of the client device based on the determined location of the reported remote unit.

* * * * *